（12) United States Patent
Dubé et al.

(10) Patent No.: US 12,514,832 B2
(45) Date of Patent: Jan. 6, 2026

(54) METHODS FOR USING LOW-DOSE COLCHICINE AFTER MYOCARDIAL INFARCTION

(71) Applicant: INSTITUT DE CARDIOLOGIE DE MONTREAL, Montreal (CA)

(72) Inventors: Marie-Pierre Dubé, Montreal (CA); Jean-Claude Tardif, Montreal (CA)

(73) Assignee: INSTITUT DE CARDIOLOGIE DE MONTREAL, Montreal (CA)

( * ) Notice: Subject to any disclaimer, the term of this patent is extended or adjusted under 35 U.S.C. 154(b) by 787 days.

(21) Appl. No.: 17/776,690

(22) PCT Filed: Nov. 13, 2020

(86) PCT No.: PCT/CA2020/051559
§ 371 (c)(1),
(2) Date: May 13, 2022

(87) PCT Pub. No.: WO2021/092703
PCT Pub. Date: May 20, 2021

(65) Prior Publication Data
US 2022/0401388 A1    Dec. 22, 2022

Related U.S. Application Data

(60) Provisional application No. 62/935,751, filed on Nov. 15, 2019.

(51) Int. Cl.
*A61K 31/165*     (2006.01)
*A61P 9/10*       (2006.01)
*C12Q 1/6876*     (2018.01)
*C12Q 1/6858*     (2018.01)

(52) U.S. Cl.
CPC .............. *A61K 31/165* (2013.01); *A61P 9/10* (2018.01); *C12Q 1/6876* (2013.01); *C12Q 1/6858* (2013.01); *C12Q 2600/106* (2013.01); *C12Q 2600/156* (2013.01)

(58) Field of Classification Search
CPC .................................................. A61K 31/165
See application file for complete search history.

(56) References Cited

U.S. PATENT DOCUMENTS

| | | |
|---|---|---|
| 9,744,144 B2 | 8/2017 | Nidorf |
| 10,105,319 B2 | 10/2018 | Riel |
| 10,130,585 B2 | 11/2018 | Riel |
| 10,206,891 B2 | 2/2019 | Nidorf |
| 10,265,281 B2 | 4/2019 | Nidorf |
| 11,400,063 B2 | 8/2022 | Tardif |
| 2018/0318221 A1 | 11/2018 | Riel |
| 2019/0054028 A1 | 2/2019 | Riel |
| 2019/0117598 A1 | 4/2019 | Nidorf |
| 2021/0145773 A1 | 5/2021 | Tardif |
| 2022/0249409 A1 | 8/2022 | Tardif |
| 2023/0364040 A1 | 11/2023 | Tardif |

FOREIGN PATENT DOCUMENTS

| | | |
|---|---|---|
| EP | 3093351 A1 | 11/2016 |
| WO | WO-2005/027886 A2 | 3/2005 |
| WO | WO-2007/035953 A2 | 3/2007 |
| WO | WO-2008/132763 A2 | 11/2008 |
| WO | WO-2014/066944 A1 | 5/2014 |

OTHER PUBLICATIONS

Akodad et al., "Colchicine and myocardial infarction: A review," Arch Cardiovasc Dis. 113(10):652-659 (Oct. 2020).
Akodad et al., "Interest of colchicine in the treatment of acute myocardial infarct responsible for heart failure in a mouse model," Int J Cardiol. 240:347-353 (Aug. 2017).
Bouabdallaoui et al., "Time-to-treatment initiation of colchicine and cardiovascular outcomes after myocardial infarction in the Colchicine Cardiovascular Outcomes Trial (COLCOT)," Eur Heart J. 00:1-8 (Nov. 2020).
Deftereos et al., "Anti-Inflammatory Treatment With Colchicine in Acute Myocardial Infarction: A Pilot Study," Circulation. 132(15):1395-403 (Oct. 2015).
Dubé et al., "Pharmacogenomics of the Efficacy and Safety of Colchicine in COLCOT," Circ Genom Precis Med. 14(2): e003183 (Apr. 2021) (7 pages).
Extended European Search Report for European Patent Application No. 20887173.1, dated Nov. 3, 2023 (10 pages).
Hennessy et al., "The Low Dose Colchicine after Myocardial Infarction (LoDoCo-MI) study: A pilot randomized placebo controlled trial of colchicine following acute myocardial infarction," Am Heart J. 215:62-69 (Jun. 2019).
Montreal Heart Institute, "Colchicine Cardiovascular Outcomes Trial (COLCOT) (COLCOT)", U.S. National Library of Medicine, ClinicalTrials.gov Identifier: NCT02551094, <https://clinicaltrials.gov/ct2/show/NCT02551094>, retrieved Mar. 15, 2021, first posted Sep. 16, 2015 (9 pages).
Newby, "Inflammation as a Treatment Target after Acute Myocardial Infarction," N Engl J Med. 381(26):2562-2563 (Dec. 2019).
Nidorf et al., "Why Colchicine Should Be Considered for Secondary Prevention of Atherosclerosis: An Overview," Clin Ther. 41(1):41-48 (Jan. 2019).
Tucker et al., "Colchicine as a Novel Therapy for Suppressing Chemokine Production in Patients With an Acute Coronary Syndrome: A Pilot Study," Clin Ther. 41(10):2172-2181 (Aug. 2019).
Vaidya et al., "Colchicine Therapy and Plaque Stabilization in Patients With Acute Coronary Syndrome: A CT Coronary Angiography Study," JACC Cardiovasc Imaging. 11(2 PT 2):305-316 (Feb. 2018).
Vaidya et al., "The Role of Colchicine in Acute Coronary Syndromes," Clin Ther. 41(1):11-20 (Jan. 2019).

(Continued)

*Primary Examiner* — Paul V Ward
(74) *Attorney, Agent, or Firm* — Clark & Elbing LLP

(57) ABSTRACT

The invention features methods of treating a patient after having a myocardial infarction including administering colchicine to a patient determined to have a genetic variant in the genome that is indicative of the patient benefiting from colchicine administration or not to have a genetic variant in the genome that is that is indicative of the patient suffering a gastrointestinal disorder following colchicine administration.

21 Claims, 14 Drawing Sheets

(56) References Cited

OTHER PUBLICATIONS

Fujisue et al., "Colchicine improves survival, left ventricular remodeling, and chronic cardiac function after acute myocardial infarction," Circ J. 2017 81(8):1174-82 (2017).
International Preliminary Report on Patentability for International Patent Application No. PCT/CA2020/051559 issued May 17, 2022 (7 pages).
International Search Report and Written Opinion for International Application No. PCT/CA2020/051559, mailed Jan. 15, 2021 (10 pages).
Nidorf et al., "Low-dose colchicine for secondary prevention of cardiovascular disease," J Am Coll Cardiol. 61(4):404-410 (2013).
Rustemoglu et al., "MDR1 gene polymorphisms may be associated with Behçet's disease and its colchicum treatment response," Gene. 505(2):333-9 (2012).
Tardif et al., "Efficacy and Safety of Low-Dose Colchicine after Myocardial Infarction," N Engl J Med. 381(26):2497-2505 (Dec. 2019).
"History of Changes for Study: NCT02551094: Colchicine Cardiovascular Outcomes Trial (COLCOT)," U.S. National Library of Medicine, <https://clinicaltrials.gov/ct2/history/NCT02551094?A=8&B=8&C=merged#StudyPageTop>, dated Oct. 12, 2019, retrieved on Oct. 5, 2022 (9 pages).
Tufan et al., "Association of drug transporter gene ABCB1 (MDR1) 3435C to T polymorphism with colchicine response in familial Mediterranean fever," J Rheumatol. 34(7): 1540-4 (2007).
Wendling, "The Earlier the Better for Colchicine Post-MI: COLCOT," Medscape, <https://www.medscape.com/viewarticle/937041_print>, dated Sep. 8, 2020, retrieved on Oct. 5, 2022 (2 pages).

METHODS FOR USING LOW-DOSE COLCHICINE AFTER MYOCARDIAL INFARCTION

BACKGROUND OF THE INVENTION

The invention relates to a treatment regimen for patients after suffering a myocardial infarction.

Inflammation appears to play an important role in atherosclerosis (Hansson (2005) N Engl J Med 352:1685-95). Inhibition of interleukin-1β by the injectable monoclonal antibody canakinumab led to a 15% lower risk of cardiovascular events than was observed with placebo in the Canakinumab Antiinflammatory Thrombosis Outcomes Study (CANTOS) but also led to a slightly higher incidence of fatal infections (Ridker et al. (2017) N Engl J Med 377:1119-31). In contrast, methotrexate did not affect cardiovascular outcomes or plasma markers of inflammation in the Cardiovascular Inflammation Reduction Trial (CIRT) (Ridker et al. (2019) N Engl J Med 380:752-62). Considering these differing results and given that canakinumab is not clinically available for cardiovascular prevention, the search for a widely used alternative antiinflammatory treatment that may reduce the risk of atherosclerotic events among patients with coronary artery disease continues.

Colchicine is an inexpensive, orally administered, potent anti-inflammatory medication that was initially extracted from the autumn *crocus* and has been used for centuries. Its mechanism of action is through the inhibition of tubulin polymerization and microtubule generation and, possibly, effects on cellular adhesion molecules, inflammatory chemokines, and the inflammasome (Ravelli et al. (2004) Nature 428:198-202; Perico et al. (1996) J Am Soc Nephrol 7:594-601; Pope et al. (2007) *Arthritis Rheum* 56:3183-8). Colchicine is currently indicated for the treatment of gout, familial Mediterranean fever, and pericarditis (Cerquaglia et al. (2005) Curr Drug Targets Inflamm Allergy 4:117-24; and Imazio et al. (2005) Circulation 112:2012-6).

In the Low-Dose Colchicine (LoDoCo) trial, patients with stable coronary disease treated 1 with colchicine at a dose of 0.5 mg once daily had fewer cardiovascular events than those not receiving colchicine (Nidorf et al. (2013) J Am Coll Cardiol 61:404-10). However, that trial enrolled only 532 patients and was not placebo-controlled.

Because acute coronary syndromes are associated with higher risks of recurrent events and exacerbated inflammation a need exists in the art for new treatment regimens.

SUMMARY OF THE INVENTION

As is disclosed herein, a clinical trial referred to as the Colchicine Cardiovascular Outcomes Trial (COLCOT) was conducted to evaluate the effects of colchicine on cardiovascular outcomes as well as its long-term safety profile in patients who had recently had a myocardial infarction.

Our results evidence that the use of colchicine in patients who have recently had a myocardial infarction significantly improved their quality of life in several ways. Colchicine, for example, at a daily low dose of 0.5 mg led to a statistically significant lower risk of ischemic cardiovascular events than placebo. Death from cardiovascular causes, resuscitated cardiac arrest, myocardial infarction, stroke, or urgent hospitalization for angina leading to coronary revascularization was also significantly lower among the patients who received 0.5 mg of colchicine than those who received placebo. Indeed, the methods described herein surprisingly and significantly reduce patient morbidity. For example, patients receiving low dose colchicine had reduced morbidity relative to placebo, as is demonstrated by the respective rates of the primary composite end points for the two patient populations (P=0.02). This reduction in morbidity was particularly prominent among colchicine-receiving patients in the reduction of severe conditions, such as stroke and urgent hospitalization for angina leading to revascularization: hazard ratios are 0.26 (95% confidence interval is 0.10-0.70) and 0.50 (95% confidence interval is 0.31-0.81), respectively. Still further, unlike the use of the anti-inflammatory canakinumab for atherosclerotic events, colchicine did not increase the incidence of septic shock. Moreover, no serious adverse event of myopathy linked to colchicine occurred despite the use of statins in 99% of trial participants.

We also identified genetic markers indicative of a patient being more likely to benefit from colchicine administration after a myocardial infarction or less likely to suffer a gastrointestinal disorder following colchicine administration.

In view of the aforementioned, the invention, in one aspect, features a method of treating a patient after having a myocardial infarction including administering colchicine to a patient determined to have a genetic variant in its genome that is indicative of the patient benefiting from colchicine administration, where the genetic variant includes polymorphic site rs149354567 intergenic for the patient's CDRT8 gene and PMP22 gene on chromosome 17.

In some embodiments of the first aspect of the invention the genotype at polymorphic site rs149354567 is G-/G-.

In another embodiment of the first aspect of the invention, the genome includes a further genetic variant at polymorphic site rs75780450. In one embodiment the genotype at polymorphic site rs75780450 is C.

In a second aspect, the invention features a method of treating a male patient after having a myocardial infarction including administering colchicine to the male patient determined to have a genetic variant in its genome that is indicative of the patient benefiting from colchicine administration, where the genetic variant includes polymorphic site rs10811106 in the patient's SAXO1 gene on chromosome 9.

In some embodiments of the second aspect of the invention, the genotype at polymorphic site rs10811106 is C/C.

In other embodiments of the second aspect of the invention, the genome includes a further genetic variant at a polymorphic site selected from the group consisting of rs 10118790, rs28733572, rs1854156, and rs10963895 or selected from the group consisting of rs10118790, rs28733572, and rs1854156. In some embodiments, the genotype at polymorphic site rs10118790, rs28733572, rs1854156, and/or rs10963895 is G.

In other embodiments of the first or second aspect of the invention, the patient has two copies of the genetic variant indicative of the patient benefiting from colchicine administration.

In a third aspect, the invention features a method of treating a patient after having a myocardial infarction including administering colchicine to a patient determined not to have a genetic variant in its genome that is indicative of the patient suffering a gastrointestinal disorder following colchicine administration, where the genetic variant includes polymorphic site rs6916345 intergenic for the patient's LINC01108 gene and JARID2 gene on chromosome 6 or polymorphic site rs10128117 in the patient's SEPHS1 gene on chromosome 10.

In some embodiments of the third aspect of the invention, the genotype at polymorphic site rs6916345 is G/G. In other embodiments, the genotype at polymorphic site rs 10128117 is A/A.

In some embodiments of the third aspect of the invention, the genome includes a further genetic variant at a polymorphic site selected from the group consisting of rs9476615, rs9464702, rs9370772, rs6918045, rs6459368, rs6903188, rs9476616, rs12210439, rs9358042, rs4620126, rs7747013, rs7751771, rs7764937, rs9382993, rs6920905, rs70993041, rs9349955, rs2327827, rs9358044, and rs857414, e.g., a polymorphic site selected from the group consisting of rs6918045, rs6459368, rs6903188, rs9476616, rs7747013, rs7751771, rs7764937, rs9382993, rs6920905, rs70993041, rs9349955, rs2327827, and rs9358044, or selected from the group consisting of rs9382993 and rs6920905.

In some embodiments of the third aspect of the invention, the genotype at polymorphic site rs9476615 is T, at polymorphic site rs9464702 is G, at polymorphic site rs9370772 is T, at polymorphic site rs6918045 is T, at polymorphic site rs6459368 is A, at polymorphic site rs6903188 is G, at polymorphic site rs9476616 is G, at polymorphic site rs12210439 is A, at polymorphic site rs9358042 is T, at polymorphic site rs4620126 is G, at polymorphic site rs7747013 is G, at polymorphic site rs7751771 is C, at polymorphic site rs7764937 is C, at polymorphic site rs9382993 is C, at polymorphic site rs6920905 is C, at polymorphic site rs70993041 is TAA, at polymorphic site rs9349955 is T, at polymorphic site rs2327827 is G, at polymorphic site rs9358044 is T, and/or at polymorphic site rs857414 is G.

In other embodiments of the third aspect of the invention, the genome includes a further genetic variant at a polymorphic site selected from the group consisting of rs535968, rs825610, rs9423893, rs10906346, rs11258319, rs2476986, rs615497, rs2783648, rs2253619, rs77006996, rs7901525, rs61851591, rs7917549, rs552621122, rs58260827, rs74795203, rs7894075, rs61851592, rs61851593, rs7919509, rs7916194, rs41291319, rs41291321, rs7902331, rs61851598, rs117874450, and rs61851599, e.g., a polymorphic site selected from the group consisting of rs2253619, rs77006996, rs61851591, rs74795203, rs61851592, and rs61851593, or is selected from the group consisting of rs41291319 and rs825610.

In some embodiments, the genotype at polymorphic site rs535968 is C, at polymorphic site rs825610 is C, at polymorphic site rs9423893 is A, at polymorphic site rs10906346 is A, at polymorphic site rs11258319 is T, at polymorphic site rs2476986 is T, at polymorphic site rs615497 is G, at polymorphic site rs2783648 is A, at polymorphic site rs2253619 is T, at polymorphic site rs77006996 is T, at polymorphic site rs7901525 is A, at polymorphic site rs61851591 is A, at polymorphic site rs7917549 is A, at polymorphic site rs552621122 is A--, at polymorphic site rs58260827 is CA, at polymorphic site rs74795203 is G, at polymorphic site rs7894075 is C, at polymorphic site rs61851592 is T, at polymorphic site rs61851593 is C, at polymorphic site rs7919509 is C, at polymorphic site rs7916194 is T, at polymorphic site rs41291319 is A, at polymorphic site rs41291321 is C, at polymorphic site rs7902331 is T, at polymorphic site rs61851598 is A, at polymorphic site rs117874450 is T, and/or at polymorphic site rs61851599 is T.

In other embodiments of the third aspect of the invention, the patient has two copies of the genetic variant that is indicative of the patient suffering a gastrointestinal disorder following colchicine administration.

In a fourth aspect, the invention features a method of treating a patient after having a myocardial infarction including determining whether the patient has a genetic variant in its genome that is indicative of the patient benefiting from colchicine administration or does not have a genetic variant in the genome that is that is indicative of the patient suffering from a gastrointestinal disorder following colchicine administration, and administering colchicine to the patient determined to have a genetic variant in the genome that is indicative of the patient benefiting from colchicine administration or not to have a genetic variant in the genome that is that is indicative of the patient suffering a gastrointestinal disorder following colchicine administration.

In some embodiments of the fourth aspect of the invention, the genetic variant in the genome that is indicative of the patient benefiting from colchicine administration includes polymorphic site rs149354567 in the patient's CDRT8 gene on chromosome 17. In some embodiments, the genotype at polymorphic site rs149354567 is G-/G-. In other embodiments, the genome includes a further genetic variant at polymorphic site rs75780450.

In other embodiments of the fourth aspect of the invention, the patient is male and the genetic variant in the genome that is indicative of the male patient benefiting from colchicine administration includes polymorphic site rs10811106 in the patient's SAXO1 gene on chromosome 9. In some embodiments, the genotype at polymorphic site rs10811106 is C/C.

In other embodiments of the fourth aspect of the invention, the genome includes a further genetic variant at a polymorphic site selected from the group consisting of rs10118790, rs28733572, rs1854156, and rs10963895.

In other embodiments of the fourth aspect of the invention, the genetic variant in the genome that is indicative of the patient suffering a gastrointestinal disorder following colchicine administration includes polymorphic site rs6916345 in the patient's LINC01108 gene on chromosome 6 or polymorphic site rs10128117 in the patient's SEPHS1 gene on chromosome 10. In some embodiments, the genotype at polymorphic site rs6916345 is G/G. In other embodiments, the genotype at polymorphic site rs10128117 is A/A.

In other embodiments of the fourth aspect of the invention, the genome includes a further genetic variant at a polymorphic site selected from the group consisting of rs9476615, rs9464702, rs9370772, rs6918045, rs6459368, rs6903188, rs9476616, rs12210439, rs9358042, rs4620126, rs7747013, rs7751771, rs7764937, rs9382993, rs6920905, rs70993041, rs9349955, rs2327827, rs9358044, and rs857414, e.g., at a polymorphic site selected from the group consisting of rs6918045, rs6459368, rs6903188, rs9476616, rs7747013, rs7751771, rs7764937, rs9382993, rs6920905, rs70993041, rs9349955, rs2327827, and rs9358044.

In other embodiments of the fourth aspect of the invention, the genome includes a further genetic variant at a polymorphic site selected from the group consisting of rs535968, rs825610, rs825610, rs9423893, rs10906346, rs11258319, rs2476986, rs615497, rs2783648, rs2253619, rs77006996, rs7901525, rs61851591, rs7917549, rs61851591, rs7917549, rs552621122, rs58260827, rs74795203, rs7894075, rs61851592, rs61851593, rs7919509, rs7916194, rs41291319, rs41291321, rs7902331, rs61851598, rs117874450, and rs61851599, e.g., a polymorphic site selected from the group consisting of rs2253619, rs77006996, rs61851591, rs74795203, rs61851592, and rs61851593.

In the fifth aspect, the invention features a method of identifying a subject who would benefit from the administration of colchicine, including determining the genotype of the subject at one or more polymorphic sites in the subject's CDRT8 gene, where at least one polymorphic site is rs149354567.

In the sixth aspect, the invention features a method of identifying a male subject who would benefit from the administration of colchicine, including determining the genotype of the male subject at one or more polymorphic sites in the subject's SAXO1 gene, where at least one polymorphic site is rs10811106.

In the seventh aspect, the invention features a method of identifying a subject who would benefit from the administration of colchicine, including determining the genotype of the subject at one or more polymorphic sites in the subject's LINC01108 gene, where at least one polymorphic site is rs6916345.

In the eighth aspect, the invention features a method of identifying a subject who would benefit from the administration of colchicine, including determining the genotype of the subject at one or more polymorphic sites in the subject's SEPHS1 gene, where at least one polymorphic site is rs10128117.

In some embodiments of the fourth, fifth, sixth, seventh, or eighth aspect of the invention, the determining includes obtaining a biological sample from the patient, and in other embodiments, the determining includes the use of polymerase chain reaction, ligation chain reaction, DNA microarray technology, interference RNA microarray, allele specific hybridization, laser capture micro-dissection, mass spectrometry, or pyrosequencing.

In some embodiments of any one of the aforementioned aspects of the invention, the myocardial infarction was within thirty days, e.g., the myocardial infarction was within 5, 10, 15, 20, or 25 days.

In some embodiments of any one of the aforementioned aspects of the invention, percutaneous coronary intervention was performed for treating the patient's myocardial infarction.

In some embodiments of any one of the aforementioned aspects of the invention, the patient was prescribed a medication, e.g., an antiplatelet agent such as aspirin. In other embodiments, the medication is a statin.

In some embodiments of any one of the aforementioned aspects of the invention, the patient is at a lower risk of an ischemic cardiovascular event.

In other embodiments of any one of the aforementioned aspects of the invention, the administration of colchicine is initiated upon assessment in (a) an emergency department (ED), (b) the hospital, or (c) a medical office setting.

In some embodiments of any one of the aforementioned aspects of the invention, the colchicine is in the form of a tablet or capsule.

In some embodiments of any one of the aforementioned aspects of the invention, the colchicine is administered at 0.3 to 0.7 mg, e.g., the colchicine is administered at 0.4 to 0.6 mg, or the colchicine is administered at 0.5 mg.

In some embodiments of any one of the aforementioned aspects of the invention, the colchicine is administered one, twice, or three times a day, e.g., the colchicine is administered once a day, or 0.25 mg of colchicine is administered twice a day.

Various colchicine formulations are readily available, for example, as a coated tablet, and well known in the art.

Use of colchicine in a method of treating a patient after having a myocardial infarction typically continues, as needed, throughout the life of a patient. For example, in some embodiments, the duration of treatment is for 6 months, 12 months, 18 months, 24 months, 30 months, 36 months, or even longer as is needed.

Other features and advantages of the invention will be apparent from the following Detailed Description, the Drawings, and the Claims.

Definitions

The term "polymorphism" "polymorphism site" "Polymorphic site" or "single nucleotide polymorphism site" (SNP site) or "single nucleotide polymorphism" refers to a location in the sequence of a gene which varies within a population. A polymorphism is the occurrence of two or more forms of a gene or position within a gene "allele", in a population, in such frequencies that the presence of the rarest of the forms cannot be explained by mutation alone. Preferred polymorphic sites have at least two alleles. The implication is that polymorphic alleles confer some phenotype variability on the host. Polymorphism may occur in both the coding regions and the noncoding region of genes. Polymorphism may occur at a single nucleotides site or may involve an insertion or a deletion. The location of such a polymorphism may be identified by its nucleotide position in the gene, on the chromosome or on the transcriptor by the amino acid that is altered by the nucleotide polymorphism. Individual polymorphisms are also assigned unique identifiers ("Reference SNP", "refSNP" or "rs #") known to one of skill in the art and used, e.g., in the Single Nucleotide Polymorphism Database (db SNP) of Nucleotide Sequence Variation available on the NCBI web site.

The "rs" prefix refers to a SNP in the database found at the NCB1 SNP database (ncbi.nlm.nih.gov/snp/?term). The "rs" numbers are the NCBI rsSNP ID form.

The term "genotype" refers to the genetic constitution of an organism, usually in respect to one gene or a few genes or a region of a gene relevant to a particular context (i.e. the genetic loci responsible for a particular phenotype). In particular, the specific combination of alleles at a given position in a gene, such as, for example, the genotypes G-/G-, G-/GA or GA/GA which are possible genotypes of the rs149354567 SNP, C/C, C/T, or T/T are possible genotypes of the rs10811106 SNP, A/A, A/G, or G/G are possible genotypes for the rs6916345 SNP, and T/T, T/A, or A/A are possible genotypes for the rs10128117 SNP.

DETAILED DESCRIPTION OF THE INVENTION

Figure 1:
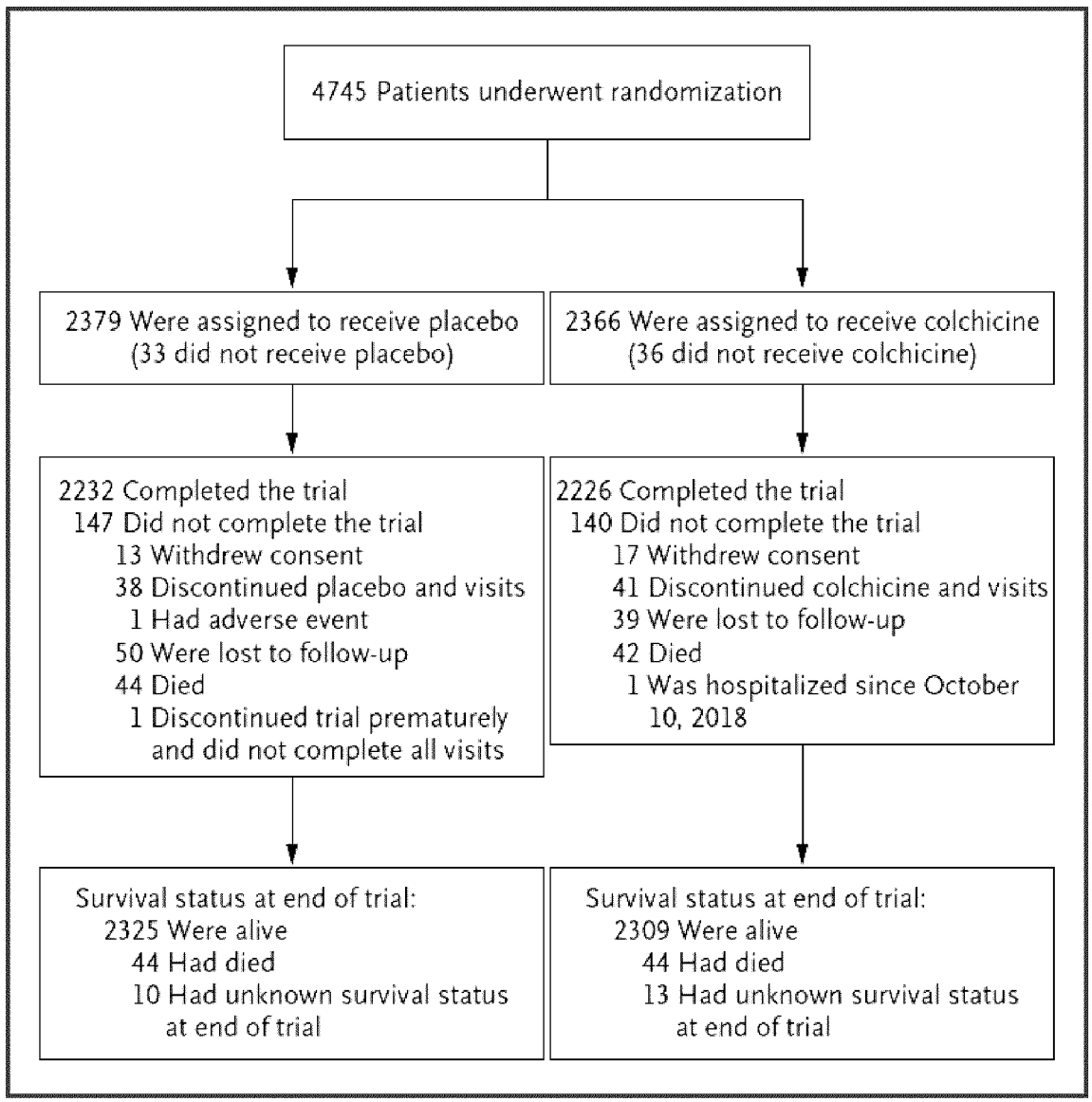
FIG. 1 shows a flow chart of the randomization and follow-up of patients in the study.

We performed a randomized, double-blind trial involving patients recruited within 30 days after a myocardial infarction. The patients were randomly assigned to receive either low-dose colchicine (0.5 mg once daily) or placebo. A total of 4745 patients were enrolled; 2366 patients were assigned to the colchicine group, and 2379 to the placebo group. Patients were followed for a median of 22.6 months.

The primary efficacy end point was a composite of death from cardiovascular causes, resuscitated cardiac arrest, myocardial infarction, stroke, or urgent hospitalization for angina leading to coronary revascularization. The components of the primary end point and safety were also assessed.

The primary end point occurred in 5.5% of the patients in the colchicine group, as compared with 7.1% of those in the placebo group (hazard ratio, 0.77; 95% confidence interval [CI], 0.61 to 0.96; P=0.02). The hazard ratios were 0.84 (95% CI, 0.46 to 1.52) for death from cardiovascular causes, 0.83 (95% CI, 0.25 to 2.73) for resuscitated cardiac arrest, 0.91 (95% CI, 0.68 to 1.21) for myocardial infarction, 0.26 (95% CI, 0.10 to 0.70) for stroke, and 0.50 (95% CI, 0.31 to 0.81) for urgent hospitalization for angina leading to coronary revascularization. Diarrhea was reported in 9.7% of the patients in the colchicine group and in 8.9% of those in the placebo group (P=0.35). Pneumonia was reported as a serious adverse event in 0.9% of the patients in the colchicine group and in 0.4% of those in the placebo group (P=0.03).

Methods

Trial Design and Oversight

In this randomized, double-blind, placebo-controlled, investigator-initiated trial, we assigned patients in a 1:1 ratio to receive either colchicine (at a dose of 0.5 mg once daily) or placebo. The trial protocol, available at NEJM.org, was designed by a trial steering committee. The protocol was approved by the institutional review board at each of the 167 centers in the 12 countries that participated in the trial (available at NEJM.org). All trial support activities, including project coordination, data management, site monitoring, and statistical oversight and analyses, were performed at the Montreal Health Innovations Coordinating Center. Potential trial end-point events were adjudicated by an independent clinical end-point committee composed of experienced cardiologists and neurologists who were unaware of the trial-group assignments. The trial was overseen by a data and safety monitoring board of independent experts. The trial medication and matching placebo were provided by Pharmascience.

Trial Population

Adult patients were eligible if they had had a myocardial infarction within 30 days before enrollment, had completed any planned percutaneous revascularization procedures, and were treated according to national guidelines that included the intensive use of statins.

Patients were excluded if they had severe heart failure, a left ventricular ejection fraction of less than 35%, stroke within the previous 3 months, a type 2 index myocardial infarction, coronary-bypass surgery either within the previous 3 years or planned, a history of noncutaneous cancer within the previous 3 years, inflammatory bowel disease or chronic diarrhea, neuromuscular disease or a nontransient creatine kinase level that was greater than three times the upper limit of the normal range (unless due to infarction), clinically significant nontransient hematologic abnormalities, severe renal disease with a serum creatinine level that was greater than two times the upper limit of the normal range; severe hepatic disease, drug or alcohol abuse, current or planned long-term systemic glucocorticoid therapy, or a history of clinically significant sensitivity to colchicine. (Details regarding eligibility criteria are provided herein.)

Written informed consent was obtained from all the patients before enrollment. Clinical evaluations occurred at 1 month and 3 months after randomization and every 3 months thereafter.

End Points

The primary efficacy end point was a composite of death from cardiovascular causes, resuscitated cardiac arrest, myocardial infarction, stroke, or urgent hospitalization for angina leading to coronary revascularization in a time-to-event analysis.

The secondary end points consisted of the components of the primary efficacy end point; a composite of death from cardiovascular causes, resuscitated cardiac arrest, myocardial infarction, or stroke; and total mortality in time-to-event analyses. Coronary revascularization, hospitalization for heart failure, atrial fibrillation, and deep venous thrombosis or pulmonary embolus were prespecified as exploratory end points in the protocol.

Additional prespecified exploratory end points included the change from baseline to 6 months in the high-sensitivity C-reactive protein level and the change from baseline to 12 months in the white-cell count. The C-reactive protein biomarker substudy was implemented after a protocol amendment and was optional for sites and for patients; 34 sites chose to participate in this substudy.

All serious adverse events were recorded. The only other adverse events recorded were those that were considered to be related to the gastrointestinal system, events that were judged by the investigator to be related to colchicine or placebo, or laboratory abnormalities that had been judged by the investigator to be clinically significant.

Statistical Analysis

In this event-driven trial, it was estimated that a sample of approximately 4500 patients undergoing randomization (with 2250 patients in each group) or, in terms of events, a total number of 301 patients with a first positively adjudicated primary end-point event would yield adequate power. The sample-size calculation was based on the primary efficacy end point and assumed a 27% lower risk with colchicine than with placebo, indicated by a hazard ratio of 0.724. With the use of a two-sided test at the 0.05 significance level, the trial would have 80% power if it continued until 301 positively adjudicated primary events occurred in the combined trial groups. The trial design assumed an event rate of 7% in the placebo group at 24 months, an 18-month recruitment period during which patients would be uniformly recruited, a 24-month minimum follow-up period, and a 1% annual rate of loss to follow-up or withdrawal of consent.

The efficacy analyses were conducted with the use of positively adjudicated data and according to the intention-to-treat principle. The primary end point was compared between the two trial groups with the use of a log-rank test, and the hazard ratio from a Cox proportional-hazards model, with a 95% confidence interval, was calculated. A Cox proportional-hazards model with adjustment for important baseline characteristics was also used as prespecified in the protocol.

The analysis of the primary end point was repeated in the per-protocol population (i.e., patients without major protocol deviations). Secondary and exploratory end points expressed as time to event were analyzed similarly. The changes from baseline to follow-up were analyzed with the use of an analysis of covariance model with adjustment for baseline value, and estimates of treatment effect are presented with 95% confidence intervals.

The efficacy end points expressed as time to event could be assessed in all patients because the event dates and censoring dates were complete, with the exception of one incomplete event date for atrial fibrillation; therefore, imputation for missing data was not done.

In the analysis of time to event, the following censoring rules were used. For death from any cause and death from cardiovascular causes, data from event-free patients who completed the trial were censored at the date of trial completion, and data from patients who did not complete the trial, such as those who were lost to follow-up or who withdrew consent, were censored at the date of last contact or the date of the assessment of survival status, whichever was later.

For the analysis of death from cardiovascular causes, patients who died from a noncardiovascular cause had their data censored at the time of death.

For all other end points, including the primary end point, the same censoring rules applied, but the survival status was not used because no formal assessment of end points was done at the assessment of survival status.

An analysis of the components of the primary end point with death from noncardiovascular causes as a competing event for death from cardiovascular causes, and with death from any cause as a competing event for the other components, was conducted with the use of the Fine and Gray subdistribution hazard model (Fine et al. (1999) J Am Stat Assoc 94:496-509). No missing data were imputed except for age (see notes to Tables infra).

To account for the occurrence of multiple primary end-point events within patients, recurrent-event analyses were undertaken with the use of negative binomial regression, Andersen-Gill, and Wei-Lin-Weissfeld models (Rogers et al. (2014) Eur J Heart Fail 16:33-40; Andersen et al. (1982) Ann Stat 1982; 10:1100-20; Lin et al. (1989) J Am Stat Assoc 84:1074-8; Lin et al. (2000) J R Stat Soc 62:711-30; Wei et al. (1997) Stat Med 16:833-9; Ghosh (2000) Control Clin Trials 21:115-26; Li and Lagakos (1997) Use of the Wei-Lin-Weissfeld method for the analysis of a recurring and a terminating event. Stat Med 16:925-40; Metcalfe et al. (2006) Stat Med 25:165-79; Jahn-Eimermacher (2008) Comparison of the Andersen-Gill model with Poisson and negative binomial regression on recurrent event data. Comput Stat Data Anal 52:4989-97). bookmark61

An interim analysis was performed after 50% of the primary end-point events had been positively adjudicated. The prespecified stopping rule for efficacy was based on the Lan-DeMets procedure with the O'Brien-Fleming alpha-spending function. After review of the interim results, the data and safety monitoring board recommended that the trial should continue as planned.

To account for this interim analysis, the statistical significance level was set to 0.0490 for the final analysis of the primary end point. All other statistical tests were two-sided and conducted at the 0.05 significance level. Statistical analyses were performed with the use of SAS software, version 9.4 (SAS Institute). There was no prespecified plan to adjust for multiple comparisons across the multiple methods that were used to analyze the primary and secondary end points; results of these analyses are reported with point estimates and 95% confidence intervals, without P values. The 95% confidence intervals were not adjusted for multiple comparisons, and inferences drawn from them may not be reproducible. The final amendment to the statistical analysis plan was approved on Aug. 28, 2019, before unblinding of the trial-group assignments occurred.

Genotyping Methods

Identification of the particular genotype of a DNA sample may be performed by any of a number of methods well known to one of skill in the art. For example, identification of a polymorphism can be accomplished by cloning of the allele and sequencing it using techniques well known in the art. Alternatively, the gene sequences can be amplified from genomic DNA, e.g., using polymerase chain reaction (PCR), and the product sequenced. Numerous methods are known in the art for isolating and analyzing a subject's DNA for a given genetic marker including PCR, ligation chain reaction (LCR) or ligation amplification and amplification methods such as self-sustained sequence replication. Several non-limiting methods for analyzing a patient's DNA for mutations at a given genetic locus are described below.

DNA microarray technology, e.g., DNA chip devices and high-density microarrays for high-throughput screening applications and lower-density microarrays, may be used. Methods for microarray fabrication are known in the art and include various inkjet and microjet deposition or spotting technologies and processes, in situ or on-chip photolithographic oligonucleotide synthesis processes, and electronic DNA probe addressing processes. The DNA microarray hybridization applications has been successfully applied in the areas of gene expression analysis and genotyping for point mutations, single nucleotide polymorphisms (SNPs), and short tandem repeats (STRs). Additional methods include interference RNA microarrays and combinations of microarrays and other methods such as laser capture microdissection (LCM), comparative genomic hybridization (CGH) and chromatin immunoprecipitation (ChIP). See, e.g., He et al. (2007) Adv. Exp. Med. Biol. 593:117-133 and Heller (2002) Annu. Rev. Biomed. Eng. 4:129-153. Other methods include PCR, xMAP, invader assay, mass spectrometry, and pyrosequencing (Wang et al. (2007) Microarray Technology and Cancer Gene Profiling Vol 593 of book series Advances in Experimental Medicine and Biology, pub. Springer New York).

Another detection method is allele specific hybridization using probes overlapping the polymorphic site and having about 5, or alternatively 10, or alternatively 20, or alternatively 25, or alternatively 30 nucleotides around the polymorphic region. For example, several probes capable of hybridizing specifically to the allelic variant or genetic marker of interest are attached to a solid phase support, e.g., a "chip." Oligonucleotide probes can be bound to a solid support by a variety of processes, including lithography: Mutation detection analysis using these chips comprising oligonucleotides, also termed "DNA probe arrays" is described e.g., in Cronin et al. (1996) Human Mutation 7': 244.

In other detection methods, it is necessary to first amplify at least a portion of the gene prior to identifying the allelic variant. Amplification can be performed, e.g., by PCR and/or LCR or other methods well known in the art.

In some cases, the presence of the specific allele in DNA from a subject can be shown by restriction enzyme analysis. For example, the specific nucleotide polymorphism can result in a nucleotide sequence comprising a restriction site which is absent from the nucleotide sequence of another allelic variant.

In a further embodiment, protection from cleavage agents (such as a nuclease, hydroxylamine or osmium tetroxide and with piperidine) can be used to detect mismatched bases.in RNA/RNA DNA/DNA, or RNA/DNA heteroduplexes (see, e.g., Myers et al. (1985) Science 230:1242). In general, the technique of "mismatch cleavage" starts by providing duplexes formed by hybridizing a probe, e.g., RNA or DNA, which is optionally labeled, comprising a nucleotide sequence of the allelic variant of the gene with a sample nucleic acid, obtained from a tissue sample. The double-stranded duplexes are treated with an agent that cleaves single-stranded regions of the duplex such as those formed from base pair mismatches between the control and sample strands. For instance, RNA/DNA duplexes can be treated with RNase and DNA/DNA hybrids treated with SI nuclease to enzymatically digest the mismatched regions. Alternatively, either DNA/DNA or RNA/DNA duplexes can be treated with hydroxylamine or osmium tetroxide and with piperidine in order to digest mismatched regions. After digestion of the mismatched regions, the resulting material is then separated by size on denaturing polyacrylamide gels to determine whether the control and sample nucleic acids have an identical nucleotide sequence or in which nucleotides they are different. See, for example, U.S. Pat. No. 6,455,249; Cotton et al. (1988) Proc. Natl. Acad. Sci. USA 85:4397; Saleeba et al. (1992) Meth. Enzymol. 217:286-295.

Alterations in electrophoretic mobility may also be used to identify the particular allelic variant. For example, single strand conformation polymorphism (SSCP) may be used to detect differences in electrophoretic mobility between mutant and wild type nucleic acids (Orita et al. (1989) Proc Natl. Acad. Sci USA 86:2766; Cotton (1993) Mutat. Res. 285:125-144 and Hayashi (1992) Genet. Anal. Tech. Appl. 9:73-79). Single-stranded DNA fragments of sample and control nucleic acids are denatured and allowed to renature. The secondary structure of single-stranded nucleic acids varies according to sequence; the resulting alteration in electrophoretic mobility enables the detection of even a single base change. The DNA fragments may be labeled or detected with labeled probes. The sensitivity of the assay may be enhanced by using RNA (rather than DNA), in which the secondary structure is more sensitive to a change in sequence. In another preferred embodiment, the subject method utilizes heteroduplex analysis to separate double stranded heteroduplex molecules on the basis of changes in electrophoretic mobility (Keen et al. (1991) Trends Genet. 7:5).

The identity of the allelic variant or genetic marker may also be obtained by analyzing the movement of a nucleic acid comprising the polymorphic region in polyacrylamide gels containing a gradient of denaturant, which is assayed using denaturing gradient gel electrophoresis (DGGE) (Myers et al. (1985) Nature 313:495). When DGGE is used as the method of analysis, DNA will be modified to ensure that it does not completely denature, for example by adding a GC clamp of approximately 40 bp of high-melting GC-rich DNA by PCR.

In a further embodiment, a temperature gradient is used in place of a denaturing agent gradient to identify differences in the mobility of control and sample DNA (Rosenbaum and Reissner (1987) Biophys. Chem. 265:1275).

Examples of techniques for detecting differences of at least one nucleotide between 2 nucleic acids include, but are not limited to, selective oligonucleotide hybridization, selective amplification, or selective primer extension. For example, oligonucleotide probes may be prepared in which the known polymorphic nucleotide is placed centrally (allele-specific probes) and then hybridized to target DNA under conditions which permit hybridization only if a perfect match is found (Saiki et al. (1986) Nature 324:163); Saiki et al. (1989) Proc. Natl. Acad. Sci. USA 86:6230). Such allele specific oligonucleotide hybridization techniques are used for the detection of the nucleotide changes in the polymorphic region of the gene. For example, oligonucleotide probes having the nucleotide sequence of the specific allelic variant are attached to a hybridizing membrane and this membrane is then hybridized with labeled sample nucleic acid. Analysis of the hybridization signal will then reveal the identity of the nucleotides of the sample nucleic acid.

Alternatively, allele specific amplification technology which depends on selective PCR amplification may be used. Oligonucleotides used as primers for specific amplification may carry the allelic variant of interest in the center of the molecule (so that amplification depends on differential hybridization) (Gibbs et al. (1989) Nucl. Acids Res. 17:2437-2448) or at the extreme 3' end of one primer where, under appropriate conditions, mismatch can prevent, or reduce polymerase extension (Prossner (1993) Tibtech11: 238 and Newton et al. (1989) Nucl. Acids Res. 17:2503). This technique is also termed "PROBE" for PRobeOligo Base Extension. In addition, it may be desirable to introduce a novel restriction site in the region of the mutation to create cleavage-based detection (Gasparini et al. (1992) Mol. Cell. Probes 6:1).

In another embodiment, identification of the allelic variant or genetic marker is carried out using an oligonucleotide ligation assay (OLA), as described, e.g., in U.S. Pat. No. 4,998,617 and in Laridegren, U. et al. (1998) Science 241:1077-1080. The OLA protocol uses two oligonucleotide probes which are designed to be capable of hybridizing to abutting sequences of a single strand of a target. One of the oligonucleotides is linked to a separation marker, e.g., biotinylated, and the other is detectably labeled. If the precise complementary sequence is found in a target molecule, the oligonucleotides will hybridize such that their termini abut, and create a ligation substrate. Ligation then permits the labeled oligonucleotide to be recovered using avidin, or another biotin ligand. Nickerson, D. A. et al. have described a nucleic acid detection assay that combines attributes of PCR and OLA (Nickerson, D. A. et al. (1990) Proc. Natl. Acad. Sci. USA 87:8923-8927). In this method, PCR is used to achieve the exponential amplification of target DNA, which is then detected using OLA. A variation of the OLA method as described in Tobe et al. (1996) Nucleic Acids Res. 24:3728 each allele specific primers is labeled with a unique hapten, i.e. digoxigenin and fluorescein and each OLA reaction is detected using hapten specific antibodies labeled with reporter enzymes.

The invention provides methods for detecting a single nucleotide polymorphism (SNP) in a region of the genome in the vicinity of the CDRT8, PMP22, SAXO1, LINC01108, JARID2, PHYH, or SEPHS1 gene. Because single nucleotide polymorphisms are flanked by regions of invariant sequence, their analysis requires no more than the determination of the identity of the single variant nucleotide and it is unnecessary to determine a complete gene sequence for each patient. Several methods have been developed to facilitate the analysis of SNPs.

The single base polymorphism can be detected by using a specialized exonuclease-resistant nucleotide, as disclosed, e.g., in U.S. Pat. No. 4,656,127. According to the method, a primer complementary to the allelic sequence immediately 3' to the polymorphic site is permitted to hybridize to a target molecule obtained from a particular animal or human. If the polymorphic site on the target molecule contains a nucleotide that is complementary to the particular exonuclease-resistant nucleotide derivative present, then that derivative will be incorporated onto the end of the hybridized primer. Such incorporation renders the primer resistant to exonuclease, and thereby permits its detection. As the identity of the exonuclease-resistant derivative of the sample is known, a finding that the primer has become resistant to exonucleases reveals that the nucleotide present in the polymorphic site of the target molecule was complementary to that of the nucleotide derivative used in the reaction. This method has the advantage that it does not require the determination of large amounts of extraneous sequence data.

A solution-based method may also be used to determine the identity of the nucleotide of the polymorphic site (WO 91/02087). As above, a primer is employed that is complementary to allelic sequences immediately 3' to a polymorphic site. The method determines the identity of the nucleotide of that site using labeled dideoxynucleotide derivatives, which, if complementary to the nucleotide of the polymorphic site will become incorporated onto the terminus of the primer.

An alternative method is described in WO 92/15712. This method uses mixtures of labeled terminators and a primer that is complementary to the sequence 3' to a polymorphic site. The labeled terminator that is incorporated is thus determined by, and complementary to, the nucleotide present in the polymorphic site of the target molecule being evaluated. The method is usually a heterogeneous phase assay, in which the primer or the target molecule is immobilized to a solid phase.

Many other primer-guided nucleotide incorporation procedures for assaying polymorphic sites in DNA have been described (Komher, J. S. et al. (1989) Nucl. Acids. Res. 17:7779-7784; Sokolov, B. P. (1990) Nucl. AcidsRes. 18: 3671; Syvanen, A.-C, et al. (1990) Genomics 8:684-692; Kuppuswamy, M. N. et al. (1991) Proc. Natl. Acad. Sci. USA 88:1143-1147; Prezant, T. R. et al. (1992) Hum. Mutat. 1:159-164; Ugozzoli, L. et al. (1992) GATA 9:107-112;

Nyren, P. et al. (1993) Anal. Biochem. 208:171-175). These methods all rely on the incorporation of labeled deoxynucleotides to discriminate between bases at a polymorphic site.

Moreover, it will be understood that any of the above methods for detecting alterations in a gene or gene product (e.g., CDRT8, PMP22, SAXO1, LINC01108, JARID2, PHYH, or SEPHS1) or a polymorphic variants in regions of the genome containing or near these genes can be used to monitor the course of treatment or therapy.

The methods described herein may be performed, for example, by using pre-packaged diagnostic kits, such as those described below, comprising at least one probe, primer nucleic acid, or reagent which may be conveniently used for genotyping, e.g., analyzing a genetic marker present in regions of the genome in or near the CDRT8, PMP22, SAXO1, LINC01108, JARID2, PHYH, or SEPHS1 gene to determine whether an individual has an increased likelihood of benefiting from treatment with colchicine. In particular the genetic markers are as described herein.

Primers or probes of the present invention, for use as reagents for genotyping genetic markers present in regions of the genome containing or near the CDRT8, PMP22, SAXO1, LINC01108, JARID2, PHYH, or SEPHS1 gene, include a synthetic nucleotide sequence that is complimentary to and hybridizes with a contiguous sequence within a region of the genome containing or near the CDRT8, PMP22, SAXO1, LINC01108, JARID2, PHYH, or SEPHS1 gene, of preferably 12 to 30 nucleotides, adjacent to or encompassing one or more SNPs described herein, such as, rs149354567 or rs75780450 for the intergenic region of the CDRT8 gene and the PMP22 gene, rs10811106, rs10118790, rs28733572, rs1854156, or rs10963895 for the SAXO1 gene, rs6916345, rs9476615, rs9464702, rs9370772, rs6918045, rs6459368, rs6903188, rs9476616, rs12210439, rs9358042, rs4620126, rs7747013, rs7751771, rs7764937, rs9382993, rs6920905, rs70993041, rs9349955, rs2327827, rs9358044, or rs857414 for the intergenic region of the LINC01108 gene and the JARID2 gene, rs10128117, rs2783648, rs2253619, rs77006996, rs7901525, rs61851591, rs7917549, rs552621122, rs58260827, rs74795203, rs7894075, rs61851592, rs61851593, rs7919509, rs7916194, rs41291319, rs41291321, rs7902331, rs61851598, rs117874450, or rs61851599 for the intragenic region of the SEPHS1 gene and PHYH gene or the region upstream or downstream of the SEPHS1 gene, and rs535968, rs825610, rs9423893, rs10906346, rs11258319, rs2476986, rs615497 for the SEPHS1 gene.

In other aspects a primer includes 100 or fewer nucleotides, in certain aspects from 12 to 50 nucleotides or from 12 to 30 nucleotides. The primer is at least 70% identical to the contiguous sequence or to the complement of the contiguous nucleotide sequence, preferably at least 80% identical, and more preferably at least 90%, 95%, 98%, 99%, or even 100% identical.

Oligonucleotides, including probes and primers, "specific for" a genetic allele or genetic marker bind either to the polymorphic region of a gene or bind adjacent to the polymorphic region of the gene. For oligonucleotides that are to be used as primers for amplification, primers are adjacent if they are sufficiently close to be used to produce a polynucleotide comprising the polymorphic region. In one embodiment, oligonucleotides are adjacent if they bind within about 1-2 kb, e.g., less than 1 kb from the polymorphism. Specific oligonucleotides are capable of hybridizing to a sequence, and under suitable conditions will not bind to a sequence differing by a single nucleotide.

Oligonucleotides, whether used as probes or primers, can be detectably labeled. Labels can be detected either directly, for example, for fluorescent labels, or indirectly. Indirect detection can include any detection method known to one of skill in the art, including biotin-avidin interactions, antibody binding and the like. Fluorescently labeled oligonucleotides also can contain a quenching molecule. Oligonucleotides can be bound to a surface. In some embodiments, the surface is silica or glass. In some embodiments, the surface is a metal electrode.

Probes can be used to directly determine the genotype of the sample or can be used simultaneously with or subsequent to amplification. The term "probes" includes naturally occurring or recombinant single- or double-stranded nucleic acids or chemically synthesized nucleic acids. They may be labeled by nick translation, Klenow fill-in reaction, PCR or other methods known in the art. Probes of the present invention, their preparation and/or labeling are described in Sambrook et al. (1989) supra. A probe can be a polynucleotide of any length suitable for selective hybridization to a nucleic acid containing a polymorphic region of the invention. Length of the probe used will depend, in part, on the nature of the assay used and the hybridization conditions employed.

Labeled probes also can be used in conjunction with amplification of a polymorphism. (Holland et al. (1991) Proc. Natl. Acad. Sci. USA 88:7276-7280). U.S. Pat. No. 5,210,015 describes fluorescence-based approaches to provide real time measurements of amplification products during PCR. Such approaches have either employed intercalating dyes (such as ethidium bromide) to indicate the amount of double-stranded DNA present, or they have employed probes containing fluorescence-quencher pairs (also referred to as the "TaqMan.RTM." approach) where the probe is cleaved during amplification to release a fluorescent molecule whose concentration is proportional to the amount of double-stranded DNA present. During amplification, the probe is digested by the nuclease activity of a polymerase when hybridized to the target sequence to cause the fluorescent molecule to be separated from the quencher molecule, thereby causing fluorescence from the reporter molecule to appear. The TaqMan.RTM. approach uses a probe containing a reporter molecule--quencher molecule pair that specifically anneals to a region of a target polynucleotide containing the polymorphism.

Probes can be affixed to surfaces for use as "gene chips." Such gene chips can be used to detect genetic variations by a number of techniques known to one of skill in the art. In one technique, oligonucleotides are arrayed on a gene chip for determining the DNA sequence of a by the sequencing by hybridization approach, such as that outlined in U.S. Pat. Nos. 6,025,136 and 6,018,041. The probes of the invention also can be used for fluorescent detection of a genetic sequence. Such techniques have been described, for example, in U.S. Pat. Nos. The probes of the invention also can be used for fluorescent detection of a genetic sequence. Such techniques have been described, for example, in U.S. Pat. Nos. 5,968,740 and 5,858,659. A probe also can be affixed to an electrode surface for the electrochemical detection of nucleic acid sequences such as described in U.S. Pat. No. 5,952,172 and by Kelley, S. O. et al. (1999) Nucl. Acids Res. 27:4830-4837. One or more probes for detecting a SNP disclosed herein can be affixed to a chip and such a device used to predict response colchicine and select an effective treatment for an individual with a myocardial infarction. It is conceivable that probes for detecting a SNP disclosed herein could be included on a chip with a variety of other probes for uses other than predicting response to colchicine.

Additionally, synthetic oligonucleotides used as probes or primers may be modified to become more stable. Exemplary nucleic acid molecules which are modified include uncharged linkages such as phosphoramidate, phosphothioate and methylphosphonate analogs of DNA (see also U.S. Pat. Nos. 5,176,996; 5,264,564 and 5,256,775). Primers and probes can include, for example, labeling methylation, internucleotide modification such as pendent moieties (e.g., polypeptides), intercalators (e.g., acridine, psoralen), chelators, alkylators, and modified linkages (e.g., alpha anomeric nucleic acids). Also included are synthetic molecules that mimic nucleotide acid molecules in the ability to bind to a designated sequence by hydrogen bonding and other chemical interactions, including peptide linkages that substitute for phosphate linkages in the nucleotide backbone.

The disclosure also relates to synthetic oligonucleotide molecules, primers, and probes that hybridize under high stringency hybridization conditions to naturally occurring oligonucleotides described herein as gene markers of the CDRT8, PMP22, SAXO1, LINC01108, JARID2, PHYH, or SEPHS1 gene. Oligonucleotides can be detected and/or isolated by specific hybridization, under high stringency conditions. "High stringency conditions" are known in the art and permit specific hybridization of a first oligonucleotide to a second oligonucleotide where there is a high degree of complimentarity between the first and second oligonucleotide. For the genotyping methods disclosed herein this degree of complimentarity is between 80% and 100% and preferably between 90% and 100%

The SNPs described herein can also be detected from pre-existing data, such as whole genome sequence data present in a data base. Included herein is a computer implemented method of querying genomic data to determine a genotype for predicting the response of a patient to a colchicine and treating the patient accordingly.

Sample nucleic acid for use in the genotyping methods, treatment selection or methods of treatment can be obtained from any cell type or tissue of a subject. For example, a subject's bodily fluid, a sample, (e.g. blood) can be obtained by known techniques. Alternatively, nucleic acid tests can be performed on dry samples (e.g., hair or skin). More particularly, the sample nucleic acid for genotyping methods, treatment selection or methods of treatment will be obtained from blood cell type.

As set forth herein, the disclosure also provides treatment selection methods comprising detecting one or more genetic markers present in or near the CDRT8, PMP22, SAXO1, LINC01108, JARID2, PHYH, or SEPHS1 gene. In some embodiments, the methods use probes or primers including nucleotide sequences which are complementary to a polymorphic site in the region of the genome containing or near the CDRT8, PMP22, SAXO1, LINC01108, JARID2, PHYH, or SEPHS1 gene. Accordingly, the disclosure provides kits including probes and primers for performing the genotyping methods described herein.

In some embodiments, the disclosure provides kits useful for determining whether a patient with a myocardial infarction has an increased likelihood of benefiting from treatment with colchicine. Such kits contain one of more of the reagents, in particular primers or probes, described herein and instructions for use.

The kits can include at least one probe or primer that is capable of specifically hybridizing to a polymeric site in the region of the genome containing or near the CDRT8, PMP22, SAXO1, LINC01108, JARID2, PHYH, or SEPHS1 gene and instructions for use. The kits can include at least one of the above described nucleic acids. Kits useful for amplifying at least a portion of the CDRT8, PMP22, SAXO1, LINC01108, JARID2, PHYH, or SEPHS1 gene generally include two primers, at least one of which is capable of hybridizing to the allelic variant sequence. Such kits are suitable for detection of genotype by, for example, fluorescence detection, by electrochemical detection, or by other detection.

Yet other kits include at least one reagent useful to perform the assay. For example, the kit can include an enzyme. Alternatively the kit can include a buffer or any other useful reagent.

The kits can include all or some of the positive controls, negative controls, reagents, primers, sequencing markers, probes and antibodies described herein for determining the subject's genotype at a polymeric site in the region of the genome containing or near the CDRT8, PMP22, SAXO1, LINC01108, JARID2, PHYH, or SEPHS1 gene.

Results

Patients

Trial enrollment began in December 2015 and was completed in August 2018; the last trial visit was in July 2019. A total of 4745 patients underwent randomization (with 2366 being assigned to the colchicine group and 2379 to the placebo group) and were followed for a median of 22.6 months. At the time of the database lock on Aug. 28, 2019, and unblinding on Aug. 29, 2019, vital status was available for all except 23 patients (99.5%); 89 patients (1.9%) were lost to follow-up, and 30 patients (0.6%) withdrew consent. Details regarding the disposition of the patients are provided in FIG. 1.

The characteristics of the patients at baseline are shown in Table 1.

TABLE 1

| Characteristics of the Patients.* | | |
|---|---|---|
| Characteristic | Colchicine (N = 2366) | Placebo (N = 2379) |
| Age-yr | 60.6 ± 10.7 | 60.5 ± 10.6 |
| Female sex-no. (%) | 47 (19.9) | 437 (18.4) |
| White race-no./total no. (%)† | 1350/1850 (73.0) | 1329/1844 (72.1) |
| Body-mass index | 28.2 ± 4.8 | 28.4 ± 4.7 |
| Current smoking-no./total no. (%) | 708/2366 (29.9) | 708/2377 (29.8) |
| Hypertension-no. (%) | 1185 (50.1) | 1236 (52.0) |
| Diabetes-no. (%) | 462 (19.5) | 497 (20.9) |
| History of myocardial infarction-no. (%) | 370 (15.6) | 397 (16.7) |
| History of PCI-no. (%) | 392 (16.6) | 406 (17.1) |
| History of CABG-no. (%) | 69 (2.9) | 81 (3.4) |
| History of heart failure-no. (%) | 48 (2.0) | 42 (1.8) |
| History of stroke or TIA-no. (%) | 55 (2.3) | 67 (2.8) |
| Time from index myocardial infarction to randomization-days | 13.4 ± 10.2 | 13.5 ± 10.1 |
| PCI for index myocardial infarction-no./total no. (%) | 2192/2364 (92.7) | 2216/2375 (93.3) |
| Medication use-no. (%) | | |
| Aspirin | 2334 (98.6) | 2352 (98.9) |
| Other antiplatelet agent | 2310 (97.6) | 2337 (98.2) |
| Statin | 2339 (98.9) | 2357 (99.1) |
| Beta-blocker | 2116 (89.4) | 2101 (88.3) |

*Plus-minus values are means ±SD. Data were missing on the following characteristics: age (assessed according to date of birth: see below), for 435 patients (215 in the colchicine group and 220 in the placebo group); body-mass index (the weight in kilograms divided by the square of the height in meters), for 5 (1 and 4 patients, respectively); and information about the index myocardial infarction, for 6 (2 and 4 patients, respectively). Date of birth and race were not required fields because both were considered in some countries to be sensitive data that could allow for the identification of patients. For statistical reporting, missing information regarding the day of birth was replaced by 15, and missing information regarding the month and day of birth was replaced by July 1. CABG denotes coronary-artery bypass graft surgery, PCI percutaneous coronary intervention, and TIA transient ischemic attack.
†Race was reported by the patient.

Patients were enrolled a mean of 13.5 days after myocardial infarction. The mean age of the patients was 60.6 years, 19.2% of the patients were women, and 20.2% had diabetes. Most patients (93.0%) underwent percutaneous coronary intervention for their index myocardial infarction. Aspirin, a different antiplatelet agent, and a statin were taken by 98.8%, 97.9%, and 99.0% of the patients, respectively.

At the end of the trial, the trial regimen had been discontinued in 18.4% of the patients in the colchicine group and in 18.7% of those in the placebo group. Among the patients who discontinued the trial regimen, the median time of taking the trial drug was 7.1 months (interquartile range, 1.9 to 14.6) in the colchicine group, as compared with 6.1 months (interquartile range, 1.6 to 14.4) in the placebo group. Overall, the median duration of receipt of the trial drug was 19.6 months in the colchicine group and 19.5 months in the placebo group.

Clinical Efficacy End Points

A primary end-point event occurred in 5.5% of the patients in the colchicine group, as compared with 7.1% of those in the placebo group (hazard ratio, 0.77; 95% confidence interval [CI], 0.61 to 0.96; P=0.02 by the log-rank test). A multivariable Cox regression model with adjustment for baseline covariates yielded a similar result (Table 2).

TABLE 2

Multivariable Cox Regression Model for Time to First Primary Endpoint.

| Effect | | Adjusted Hazard Ratio (95% CI) | P Value |
|---|---|---|---|
| Randomized treatment group | Colchicine vs. Placebo | 0.78 (0.62-0.98) | 0.03 |
| Age at randomization (years) | | 1.02 (1.01-1.03) | <0.001 |
| History of diabetes | Yes vs. No | 1.86 (1.46-2.37) | <0.001 |
| Prior coronary revascularization (PCI or CABG) | Yes vs. No | 2.02 (1.58-2.58) | <0.001 |
| Prior heart failure | Yes vs. No | 1.81 (1.08-3.04) | 0.03 |

CABG denotes coronary artery bypass graft, and PCI percutaneous coronary intervention. The model was based on 4745 observations. All baseline characteristics that showed an association (P < 0.20) with the occurrence of a first positively adjudicated primary endpoint were included in the stepwise multivariable Cox regression. For age at randomization, the hazard ratio is for an increase of one year of age.

Figure 2:
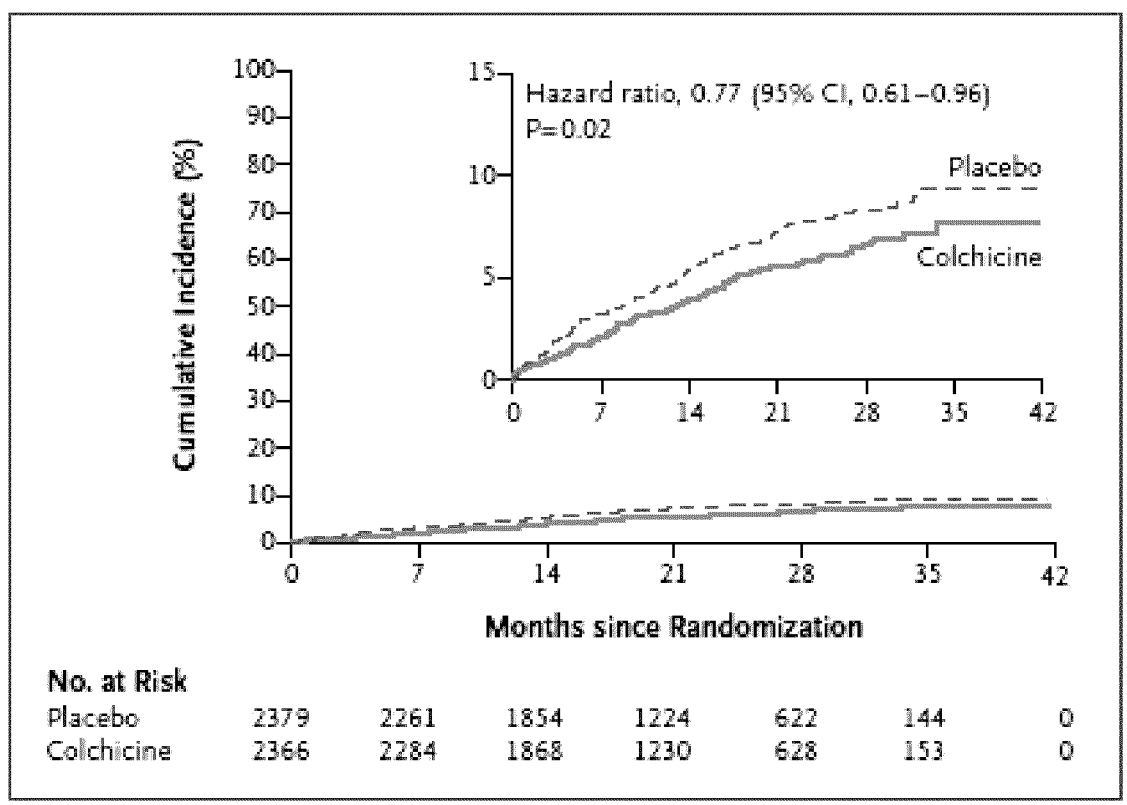
FIG. 2 shows the cumulative incidence of cardiovascular events (intention-to-treat population). Shown are the Kaplan-Meier event curves for the primary efficacy composite end point of death from cardiovascular causes, resuscitated cardiac arrest, myocardial infarction, stroke, or urgent hospitalization for angina leading to coronary revascularization in the colchicine group and the placebo group in a time-to-event analysis. The inset shows the same data on an enlarged y axis.

The event curves that were based on a Kaplan-Meier analysis of the primary efficacy end point are shown in FIG. 2.

In the prespecified per-protocol analysis involving patients who adhered to the protocol, the primary end point occurred in 5.1% of the patients in the colchicine group and in 7.1% of those in the placebo group (hazard ratio, 0.71; 95% CI, 0.56 to 0.90) (Table 3).

TABLE 3

Rates and Hazard Ratios for the Primary Endpoint and its Components in the Per-Protocol Population†.

| | Colchicine | Placebo | |
| | Per-protocol population | | Hazard Ratio |
| Clinical Outcome | N = 2260 | N = 2270 | (95% CI) |
|---|---|---|---|
| Primary endpoint-no. (%) | 115 (5.1%) | 162 (7.1%) | 0.71 (0.56-0.90) |
| CV death-no. (%) | 19 (0.8%) | 23 (1.0%) | 0.83 (0.45-1.53) |
| Resuscitated cardiac arrest-no. (%) | 5 (0.2%) | 5 (0.2%) | 1.00 (0.29-3.46) |
| MI-no. (%) | 77 (3.4%) | 92 (4.1%) | 0.84 (0.62-1.14) |
| Stroke-no. (%) | 5 (0.2%) | 19 (0.8%) | 0.26 (0.10-0.71) |
| Urgent hospitalization for angina requiring revascularization-no. (%) | 22 (1.0%) | 47 (2.1%) | 0.47 (0.28-0.78) |

CV denotes cardiovascular, and MI myocardial infarction.

†The per-protocol population consisted of patients without major protocol deviations.

Table 4 shows the percentages of patients with events and the hazard ratios for the components of the primary end point, including death from cardiovascular causes (hazard ratio, 0.84; 95% CI, 0.46 to 1.52), resuscitated cardiac arrest (hazard ratio, 0.83; 95% CI, 0.25 to 2.73), myocardial infarction (hazard ratio, 0.91; 95% CI, 0.68 to 1.21), stroke (hazard ratio, 0.26; 95% CI, 0.10 to 0.70), and urgent hospitalization for angina leading to coronary revascularization (hazard ratio, 0.50; 95% CI, 0.31 to 0.81). The hazard ratios remained unchanged in the analysis that took competing events into account.

TABLE 4

Major Clinical End Points (Intention-to-Treat Population).*

| | Colchicine (N = 2366) | Placebo (N = 2379) | Hazard Ratio | |
| End Point | number (percent) | | (95% CI) | P Value |
|---|---|---|---|---|
| Primary composite end point | 131 (5.5) | 170 (7.1) | 0.77 (0.61-0.96) | 0.02† |
| Components of primary end point | | | | |
| Death from cardiovascular causes | 20 (0.8) | 24 (1.0) | 0.84 (0.46-1.52) | |
| Resuscitated cardiac arrest | 5 (0.2) | 6 (0.3) | 0.83 (0.25-2.73) | |
| Myocardial infarction | 89 (3.8) | 98 (4.1) | 0.91 (0.68-1.21) | |
| Stroke | 5 (0.2) | 19 (0.8) | 0.26 (0.10-0.70) | |
| Urgent hospitalization for angina leading to revascularization | 25 (1.1) | 50 (2.1) | 0.50 (0.31-0.81) | |

TABLE 4-continued

Major Clinical End Points (Intention-to-Treat Population).*

| End Point | Colchicine (N = 2366) number (percent) | Placebo (N = 2379) number (percent) | Hazard Ratio (95% CI) | P Value |
|---|---|---|---|---|
| Secondary composite end point‡ | 111 (4.7) | 130 (5.5) | 0.85 (0.66-1.10) | |
| Death | 43 (1.8) | 44 (1.8) | 0.98 (0.64-1.49) | |
| Deep venous thrombosis or pulmonary embolus | 10 (0.4) | 7 (0.3) | 1.43 (0.54-3.75) | |
| Atrial fibrillation | 36 (1.5) | 40 (1.7) | 0.93 (0.59-1.46) | |

*Only the initial event was counted in the analyses of time to first event for the primary composite end point and for the secondary composite end point. In the component analysis, all events (first and subsequent) were counted separately.
†The log-rank test and the multivariable Cox proportional-hazards model including age, history of diabetes, previous coronary revascularization, and previous heart failure yielded similar P values.
‡The secondary composite end point included death from cardiovascular causes, resuscitated cardiac arrest, myocardial infarction, and stroke.

The secondary efficacy end point consisting of a composite of death from cardiovascular causes, cardiac arrest, myocardial infarction, or stroke occurred in 4.7% of the patients in the colchicine group and in 5.5% of those in the placebo group (hazard ratio, 0.85; 95% CI, 0.66 to 1.10). Data on the primary, secondary, and exploratory efficacy end points are provided in Table 4. Two patients had a first positively adjudicated event of urgent hospitalization for angina leading to coronary revascularization within 14 days after randomization. The median time to this clinical end point was 258 days.

Efficacy results in prespecified subgroups are shown in Table 5. The total number of primary end-point events (first and recurrent) was 154 in the colchicine group and 223 in the placebo group, over periods of 52,949 and 53,060 patient-months of follow-up, respectively. Thus, the primary end-point event rates per 100 patient-months were 0.29 in the colchicine group and 0.42 in the placebo group (rate ratio, 0.66; 95% CI, 0.51 to 0.86) (Table 6).

TABLE 5

Primary Efficacy Composite Endpoint in Prespecified Subgroups†.

| Subgroup | Colchicine | Placebo | Hazard ratio (95% CI) |
|---|---|---|---|
| | no. of patients with event/total no. of patients (%) | | |
| All patients | 131/2366 (5.5%) | 170/2379 (7.1%) | 0.77 (0.61-0.96) |
| Smoking | | | |
| Non-smoker | 47/787 (6.0%) | 52/797 (6.5%) | 0.90 (0.61; 1.34) |
| Previous smoker | 46/871 (5.3%) | 77/872 (8.8%) | 0.59 (0.41; 0.85) |
| Active smoker | 38/708 (5.4%) | 41/708 (5.8%) | 0.93 (0.60; 1.44) |
| History of diabetes | | | |
| Yes | 40/462 (8.7%) | 65/497 (13.1%) | 0.65 (0.44; 0.96) |
| No | 91/1904 (4.8%) | 105/1882 (5.6%) | 0.85 (0.64; 1.13) |
| History of hypertension | | | |
| Yes | 83/1185 (7.0%) | 112/1236 (9.1%) | 0.76 (0.57; 1.01) |
| No | 48/1181 (4.1%) | 58/1143 (5.1%) | 0.80 (0.54; 1.17) |
| Prior MI | | | |
| Yes | 46/370 (12.4%) | 47/397 (11.8%) | 1.05 (0.70; 1.58) |
| No | 85/1996 (4.3%) | 123/1982 (6.2%) | 0.68 (0.51; 0.89) |
| Prior PCI or CABG | | | |
| Yes | 48/419 (11.5%) | 57/447 (12.8%) | 0.91 (0.62; 1.34) |
| No | 83/1947 (4.3%) | 113/1932 (5.8%) | 0.72 (0.54; 0.95) |
| Prior stroke or TIA | | | |
| Yes | 8/55 (14.5%) | 9/67 (13.4%) | 1.09 (0.42; 2.82) |
| No | 123/2311 (5.3%) | 161/2312 (7.0%) | 0.76 (0.60; 0.96) |
| Sex‡ | | | |
| Male | 94/1894 (5.0%) | 135/1942 (7.0%) | 0.70 (0.54; 0.91) |
| Female | 37/472 (7.8%) | 35/437 (8.0%) | 0.99 (0.63; 1.58) |

TABLE 5-continued

Primary Efficacy Composite Endpoint in Prespecified Subgroups†.

| Subgroup | Colchicine | Placebo | Hazard ratio (95% CI) |
|---|---|---|---|
| | no. of patients with event/total no. of patients (%) | | |
| White blood cell count¶ | | | |
| Below median | 41/660 (6.2%) | 46/637 (7.2%) | 0.85 (0.56; 1.29) |
| Above median | 34/637 (5.3%) | 44/664 (6.6%) | 0.80 (0.51; 1.25) |

CABG denotes coronary artery bypass graft, MI myocardial infarction, PCI percutaneous coronary intervention, and TIA transient ischemic attack.
†The final amendment to the statistical analysis plan, which listed the subgroups of interest, was approved on Aug. 28, 2019 and unblinding occurred on Aug. 29, 2019.
‡The hazard ratio for the primary endpoint was 0.70 (0.52; 0.93) in men and 0.81 (0.47; 1.41) in women in the per-protocol population.
The median value for total white blood cell count was 8.64 × $10^3/\mu L$.

TABLE 6

Total (First and Recurrent) Primary Endpoint Events.

| Total Primary Endpoint Events | | Colchicine (N = 2366) | Placebo (N = 2379) |
|---|---|---|---|
| Number of primary endpoint events per patient | 0 | 2235 | 2209 |
| | 1 | 111 | 132 |
| | 2 | 18 | 26 |
| | 3 | 1 | 9 |
| | 4 | 1 | 3 |
| Total number of primary endpoint events | | 154 | 223 |
| Total follow-up months | | 52949 | 53060 |
| Rate of primary endpoint events per 100 patient-months | | 0.29 | 0.42 |

| | | Hazard Ratio or Rate Ratio (95% CI) |
|---|---|---|
| Negative binomial model† | | 0.66 (0.51; 0.86) |
| Andersen-Gill model‡ | | 0.69 (0.54; 0.88) |
| WLW model¶ | $1^{st}$ Event | 0.77 (0.61; 0.96) |
| | $2^{nd}$ Event | 0.73 (0.48; 1.11) |
| | $3^{rd}$ Event | 0.64 (0.37; 1.10) |
| | Average | 0.77 (0.61; 0.96) |

WLW denotes Wei-Lin-Weissfeld method.
†The negative binomial regression model was used to calculate marginal rate ratio.
‡The Andersen-Gill model was used with a robust variance estimator (sandwich estimator) to calculate hazard ratio.

Regarding Table 6, the Wei-Lin-Weissfeld marginal model was used to calculate hazard ratios for the time to the first, second and third event as well as the weighted average of these hazard ratios.

To account for the occurrence of multiple primary endpoint events within patients, recurrent event analyses were undertaken using three statistical approaches as there is no strong consensus as to which method is preferable. First, a negative binomial regression model was used with the number of events as the outcome and the length of follow-up time in months as an offset term (Hansson (2005) N Engl J Med 352:1685-95). Marginal rate ratio was provided, along with 95% confidence interval. The Andersen and Gill model (Ridker et al. (2017) N Engl J Med 377:1119-31) with a robust variance estimator (Ridker et al. (2019) N Engl J Med 380:752-62; Ravelli et al. (2004) Nature 428:198-202) was utilized to account for the dependency of within-patient events based on a gap-time approach considering the time since a previous event. The Andersen-Gill model is a simple extension of the Cox model based on all events of all patients and estimates a hazard ratio assuming that the instantaneous risk of experiencing an event is the same irrespective of whether previous events occurred. Results from these two models are often similar (Perico et al. (1996) J Am Soc Nephrol 7:594-601; and Pope et al. (2007) Arthritis Rheum 56:3183-8). Finally, an approach based on the Wei, Lin and Weissfeld marginal model was conducted whereby times from randomization to first, second and subsequent event were modeled with a Cox proportional hazards model that used a covariance matrix estimate for the regression coefficients that accounted for the possible intra-patient correlation (Cerquaglia et al (2005) Curr Drug Targets Inflamm Allergy 4:117-24, Imazio et al. (2005) Circulation 112:2012-6, and Nidorf et al. (2013) J Am Coll Cardiol 61:404-10). This approach assumes that all patients are at risk for any event since randomization. Marginal hazard ratios for a $k^{th}$ event (i.e. based on time from randomization to $k^{th}$ event), as well as a weighted average of these hazard ratios, were provided along with 95% confidence intervals. It has been argued that this approach preserves the randomization and permits valid treatment effect estimation (Fine et al. (1999). J Am Stat Assoc; 94:496-509).

Biomarkers of Inflammation

High-sensitivity C-reactive protein was measured in a subgroup of only 207 patients at the time of randomization and 6 months later, and the median concentration at trial entry was 4.28 mg per liter. The baseline characteristics of these patients were similar to those of the overall population (Table 7), but the small and selected subgroup with these data limits the interpretation of these analyses. The adjusted geometric mean percent changes in the high-sensitivity C-reactive protein level at 6 months after myocardial infarction were −70.0% in the colchicine group and −66.6% in the placebo group, and the placebo-adjusted geometric mean percent change was −10.1% percentage points in the colchicine group (95% CI, −28.6 to 13.4) (Table 8).

TABLE 7

Characteristics of the Trial Patients with hs-CRP data values.

| Characteristic | Colchicine (N = 99) | Placebo (N = 108) |
|---|---|---|
| Age-years | 62.1 ± 9.7 | 61.2 ± 10.2 |
| Female sex-no. (%) | 18 (18.2%) | 14 (13.0%) |
| Caucasian-no. (%) | 91 (93.8%) | 89 (89.0%) |
| Body-mass index (kg/m²) | 28.8 ± 4.5 | 29.1 ± 4.2 |
| Smoking-no. (%) | 20 (20.2%) | 20 (18.5%) |
| Hypertension-no. (%) | 44 (44.4%) | 62 (57.4%) |
| Diabetes-no. (%) | 12 (12.1%) | 15 (13.9%) |
| Prior MI-no. (%) | 14 (14.1%) | 16 (14.8%) |

TABLE 7-continued

Characteristics of the Trial Patients with hs-CRP data values.

| Characteristic | Colchicine (N = 99) | Placebo (N = 108) |
|---|---|---|
| Prior PCI-no. (%) | 24 (24.2%) | 21 (19.4%) |
| Prior CABG-no. (%) | 4 (4.0%) | 6 (5.6%) |
| Prior heart failure-no. (%) | 4 (4.0%) | 1 (0.9%) |
| Prior stroke/TIA-no. (%) | 1 (1.0%) | 2 (1.9%) |
| Index MI to randomization-days | 17.0 ± 9.2 | 15.8 ± 9.8 |
| PCI for index MI-no. (%) | 93 (93.9%) | 104 (96.3%) |
| Aspirin use-no. (%) | 98 (99.0%) | 106 (98.1%) |
| Other anti-platelet agent-no. (%) | 98 (99.0%) | 108 (100%) |
| Statin use-no. (%) | 99 (100%) | 107 (99.1%) |
| Beta-blocker-no. (%) | 83 (83.8%) | 86 (79.6%) |

CABG denotes coronary artery bypass graft surgery, MI myocardial infarction, PCI percutaneous coronary intervention, and TIA transient ischemic attack.

TABLE 8

Biomarkers of Inflammation.

| Biomarker | Colchicine | Placebo |
|---|---|---|
| Hs-C reactive protein (mg/L) | N = 99 | N = 108 |
| Randomization, geometric mean (IQR)† | 4.27 (2.12, 7.22) | 5.09 (2.45, 11.96) |
| 6 months, geometric mean (IQR) | 1.37 (0.75, 2.13) | 1.60 (0.90, 2.65) |
| Adjusted GM percent change (95% CI)‡ | −70.0 (−74.6, −64.5) | −66.6 (−71.5, −60.8) |
| Placebo-adjusted GM percent change (95% CI)¶ | −10.1 (−28.6, 13.4) | — |
| Total white blood cell count ($10^3/\mu L$) | N = 992 | N = 980 |
| Randomization, geometric mean (IQR)† | 8.54 (7.10, 10.40) | 8.63 (7.20, 10.70) |
| 12 months, geometric mean (IQR) | 6.95 (5.99, 8.30) | 7.03 (5.96, 8.48) |
| Adjusted GM percent change (95% CI)‡ | −18.81 (−20.12, −17.47) | −19.02 (−20.46, −17.55) |
| Placebo-adjusted GM percent change (95% CI)¶ | 0.26 (−2.15, 2.72) | — |
| Circulating lymphocytes ($10^3/\mu L$) | | |
| Randomization, geometric mean (IQR)† | 1.79 (1.40, 2.40) | 1.79 (1.42, 2.46) |
| 12 months, geometric mean (IQR) | 1.83 (1.50, 2.44) | 1.82 (1.50, 2.44) |
| Adjusted GM percent change (95% CI)‡ | 1.80 (−0.46, 4.11) | 0.69 (−1.54, 2.98) |
| Placebo-adjusted GM percent change (95% CI)¶ | 1.10 (−2.06, 4.36) | — |
| Circulating neutrophils ($10^3/\mu L$) | | |
| Randomization, geometric mean (IQR)† | 5.45 (4.36, 7.15) | 5.47 (4.30, 7.46) |
| 12 months, geometric mean (IQR) | 3.95 (3.27, 5.08) | 3.99 (3.34, 5.20) |
| Adjusted GM percent change (95% CI)‡ | −27.63 (−29.48, −25.73) | −27.95 (−29.91, −25.93) |
| Placebo-adjusted GM percent change (95% CI)¶ | 0.45 (−3.28, 4.32) | — |

GM denotes geometric mean, HS high-sensitivity, and IQR inter-quartile range.
†The geometric mean was obtained by exponentiating the mean of log-transformed data.
‡The adjusted geometric mean percent change was obtained by exponentiating the adjusted mean from the analysis of covariance model (based on log-transformed data), then subtracting 1 and multiplying by 100. The bounds of the 95% confidence intervals were obtained similarly.

In Table 8, the placebo-adjusted geometric mean percent change was obtained by exponentiating the adjusted mean difference between groups from the analysis of covariance model (based on log-transformed data), then subtracting 1 and multiplying by 100.

In addition, the C-reactive protein biomarker sub-study was implemented following a protocol amendment and was optional for sites and for patients; 34 sites accepted to participate in this substudy. There were 213 and 208 patients who provided blood samples at baseline and 6 months, respectively. Paired baseline and 6-month hs-CRP values were available in 207 patients. Clinically available white blood cell counts were obtained from 2598 patients at baseline and 1998 patients at 12 months, and paired baseline and 12-month values were available in 1972 patients. Statistical analysis was conducted on the patients who provided both baseline and follow-up data and as these were exploratory analyses, no missing data was imputed.

Information about white-cell counts at baseline and at the 12-month follow-up were also available for a relatively small subgroup of 1972 patients. The adjusted geometric mean percent changes from baseline to 1 year in the total white-cell count were −18.8% in the colchicine group and −19.0% in the placebo group, with no significant difference between groups (0.3% percentage points; 95% CI, −2.2 to 2.7).

Safety and Adverse Events

The incidence of adverse events that were considered to be related to trial drug was 16.0% in the colchicine group and 15.8% in the placebo group, and the overall incidence of serious adverse events was 16.4% and 17.2%, respectively (Table 9).

TABLE 9

Adverse Events (Safety Population).*

| Event | Colchicine (N = 2330) number of patients (percent) | Placebo (N = 2346) number of patients (percent) | P Value |
|---|---|---|---|
| Any related adverse event† | 372 (16.0) | 371 (15.8) | 0.89 |
| Any serious adverse event‡ | 383 (16.4) | 404 (17.2) | 0.47 |
| Gastrointestinal adverse event | 408 (17.5) | 414 (17.6) | 0.90 |
| Gastrointestinal serious adverse event | 46 (2.0) | 36 (1.5) | 0.25 |
| Diarrhea adverse event | 225 (9.7) | 208 (8.9) | 0.35 |
| Nausea adverse event | 43 (1.8) | 24 (1.0) | 0.02 |
| Flatulence adverse event | 15 (0.6) | 5 (0.2) | 0.02 |
| Gastrointestinal hemorrhage | 7 (0.3) | 5 (0.2) | 0.56 |

TABLE 9-continued

Adverse Events (Safety Population).*

| Event | Colchicine (N = 2330) number of patients (percent) | Placebo (N = 2346) number of patients (percent) | P Value |
|---|---|---|---|
| Infection serious adverse event | 51 (2.2) | 38 (1.6) | 0.15 |
| Pneumonia serious adverse event | 21 (0.9) | 9 (0.4) | 0.03 |
| Septic shock serious adverse event | 2 (0.1) | 2 (0.1) | 0.99 |
| Hospitalization for heart failure | 25 (1.1) | 17 (0.7) | 0.21 |
| Cancer∫ | 43 (1.8) | 46 (2.0) | 0.77 |
| Anemia | 14 (0.6) | 10 (0.4) | 0.40 |
| Leukopenia | 2 (0.1) | 3 (0.1) | 0.66 |
| Thrombocytopenia | 3 (0.1) | 7 (0.3) | 0.21 |

*The safety population was defined as patients who took at least one dose of colchicine or placebo. All serious adverse events were recorded, and the only other adverse events recorded were those that were related to the gastrointestinal system, events that were judged by the investigator to be related to colchicine or placebo, or laboratory abnormalities that were judged by the investigator to be clinically significant. This table lists serious adverse events that were present in more than 2% of the patients in either trial group, adverse events that were considered to be related to colchicine or placebo in more than 5% of the patients in either trial group, and any other safety events of special interest. Chi-square tests were conducted to compare the incidence of adverse events between the trial groups.
†These adverse events were considered to be related to colchicine or placebo by the physician in charge of the participant.
‡There was one serious adverse event of myopathy, which was attributed to high-dose statin therapy (rosuvastatin at a dose of 40 mg daily) by the local investigator and academic sponsor, in a man of short stature (165 cm, 68 kg) with normal renal function in the colchicine group who had received colchicine for 8 days 3 months before the adverse event.
∫Cancers, excluding nonmelanoma skin cancers, occurred in 42 patients (1.8%) in the colchicine group and in 44 (1.9%) in the placebo group.

At least one gastrointestinal adverse event during the double-blind period occurred in 17.5% of the patients in the colchicine group, as compared with 17.6% of those in the placebo group. Diarrhea was reported in 9.7% of the patients in the colchicine group and in 8.9% of those in the placebo group (P=0.35), and nausea was more common in the colchicine group than in the placebo group (1.8% vs. 1.0%, P=0.02). Pneumonia was reported as a serious adverse event in 0.9% of the patients in the colchicine group, as compared with 0.4% of those in the placebo group (P=0.03).

In COLCOT, the risk of the primary composite efficacy end point of death from cardiovascular causes, resuscitated cardiac arrest, myocardial infarction, stroke, or urgent hospitalization for angina leading to coronary revascularization, as assessed in a time-to-event analysis, was significantly lower among the patients who were randomly assigned to receive 0.5 mg of colchicine once daily than among those who received placebo. This result was due predominantly to a lower incidence of strokes and urgent hospitalizations for angina leading to coronary revascularization.

These results were observed against a background of appropriate medications, which included aspirin, a different antiplatelet agent, and a statin in 98 to 99% of the patients. In addition, percutaneous coronary intervention was performed in 93% of the patients for their index myocardial infarction. The benefits of colchicine with regard to cardiovascular end points in COLCOT were at least as large as those of canakinumab in CANTOS (Ridker et al. (2017) N Engl J Med 377:1119-31). In the small subgroup of patients with available data, a large (>65%) reduction in the C-reactive protein level occurred over the first 6 months after myocardial infarction in both trial groups in COLCOT, but the difference between the changes in the groups was not significant. These findings must be interpreted cautiously given that this was a small subgroup that was not randomly selected from the full trial sample. A similar observation was made with white-cell counts. The different patient populations involved in the two trials—early after myocardial infarction in COLCOT and stable coronary disease in CANTOS—may also have affected the relationship between biomarkers of inflammation and the effects of treatments on ischemic end points.

The known benefits of colchicine in the treatment of pericarditis were not at play in COLCOT. Postinfarction pericarditis typically occurs within the first few days after the injury, whereas the mean time from the index myocardial infarction to randomization was 13.5 days. There were only two patients with a first positively adjudicated event of urgent hospitalization for angina leading to coronary revascularization within 14 days after randomization, and the median time to this clinical end point was 258 days.

The most common adverse events observed were gastrointestinal. Diarrhea was reported in 9.7% of the patients in the colchicine group and in 8.9% of those in the placebo group, and nausea occurred in 1.8% and 1.0%, respectively. Infection as a serious adverse event was more frequent in the colchicine group than in the placebo group (in 2.2% vs. 1.6% of the patients), and pneumonia as a serious adverse event was also more frequent in the colchicine group (0.9% vs. 0.4%). These differences in the incidence of infections could be due to the play of chance or could reflect altered immunologic responses.

In contrast to canakinumab (Ridker et al. (2017) N Engl J Med 377:1119-31), colchicine did not increase the incidence of septic shock in our trial. Infections have previously been described in patients who have attempted suicide by taking an overdose of colchicine (Kocak et al. (2008) Clin Pharm Ther 33:451-2). There was no serious adverse event of myopathy linked to colchicine despite the use of statins in 99% of the patients in the trial.

Our trial has certain limitations. The duration of follow-up was relatively short at approximately 23 months. The risks and benefits of longer-term treatment with colchicine were not evaluated. Although the inclusion of 4745 patients was sufficient for the trial to show a significant benefit with regard to the primary composite efficacy end point, a larger trial could have allowed a better assessment of individual end points and subgroups and the risks associated with colchicine. Finally, our results apply only to patients who have recently had a myocardial infarction.

In conclusion, among patients with a recent myocardial infarction, colchicine at a dose of 0.5 mg daily led to a significantly lower percentage of patients with ischemic cardiovascular events than placebo.

Genetic Analysis

As described below, we identified regions in the genome that are indicative of a patient benefiting from colchicine administration after a myocardial infarction. One such region includes an intergenic region for the CDRT8 (CMT1A duplicated region transcript 8) gene and PMP22 (peripheral myelin protein 22) gene on chromosome 17. In particular, two polymorphic sites, rs149354567 and rs75780450, were identified as potentially being indicative of a patient benefiting from colchicine administration after a myocardial infarction.

For males, we identified a region that includes the SAXO1 (stabilizer of axonemal microtubules 1) gene on chromosome 9. Here, polymorphic sites rs10811106, rs10118790, rs28733572, rs1854156, and rs10963895, intronic for the SAXO1 gene, were identified as potentially being indicative of a patient benefiting from colchicine administration.

As such, a genetic variant that is indicative of a patient who had a myocardial infarction benefiting from colchicine administration may be at polymorphic site rs149354567, rs7.5780450, rs10811106, rs10118790, rs28733572, rs1854156, or rs10963895.

We also identified regions in the genome that are indicative of a patient suffering from a gastrointestinal disorder following colchicine administration after a myocardial infarction. Such regions include the intergenic region for the LINC01108 (long intergenic non-coding RNA 1108) gene and JARID2 (Jumonji and AT-rich interaction domain containing 2) gene on chromosome 6. In these regions, polymorphic sites rs6916345, rs9476615, rs9464702, rs9370772, rs6918045, rs6459368, rs6903188, rs9476616, rs12210439, rs9358042, rs4620126, rs7747013, rs7751771, rs7764937, rs9382993, rs6920905, rs70993041, rs9349955, rs2327827, rs9358044, and rs857414 were identified as potentially being indicative of the patient suffering from a gastrointestinal disorder following colchicine administration after a myocardial infarction.

Other regions indicative of a patient suffering from a gastrointestinal disorder following colchicine administration after a myocardial infarction include the intronic regions for the SEPHS1 (selenophosphate synthetase 1) gene and its upstream and downstream regions. In these regions, polymorphic sites rs10128117, rs535968, rs825610, rs9423893, rs10906346, rs11258319, rs2476986, rs615497, rs2783648, rs2253619, rs77006996, rs7901525, rs61851591, rs7917549, rs552621122, rs58260827, rs74795203, rs7894075, rs61851592, rs61851593, rs7919509, rs7916194, rs41291319, rs41291321, rs7902331, rs61851598, rs117874450, and rs61851599 were identified as potentially being indicative of the patient suffering from a gastrointestinal disorder following colchicine administration after a myocardial infarction.

As such, a genetic variant that is indicative of a patient suffering from a gastrointestinal disorder following colchicine administration after a myocardial infarction may be at polymorphic site rs6916345, rs9476615, rs9464702, rs9370772, rs6918045, rs6459368, rs6903188, rs9476616, rs12210439, rs9358042, rs4620126, rs7747013, rs7751771, rs7764937, rs9382993, rs6920905, rs70993041, rs9349955, rs2327827, rs9358044, rs857414, rs10128117, rs535968, rs825610, rs9423893, rs10906346, rs11258319, rs2476986, rs615497, rs2783648, rs2253619, rs77006996, rs7901525, rs61851591, rs7917549, rs552621122, rs58260827, rs74795203, rs7894075, rs61851592, rs61851593, rs7919509, rs7916194, rs41291319, rs41291321, rs7902331, rs61851598, rs117874450, or rs61851599.

Figure 3:
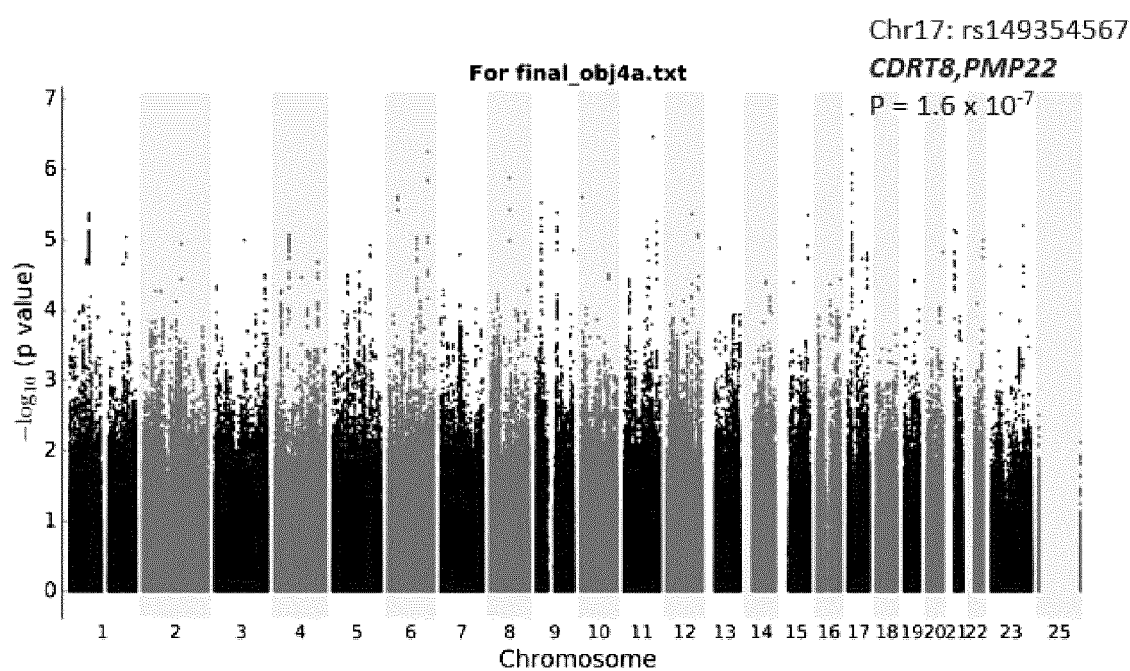
FIG. 3 is a Manhattan plot of a Genome-wide Association Study (GWAS) with common single-nucleotide polymorphisms (SNPs) with minor allele frequency (MAF)≥5% for the primary efficacy end point using a survival analysis (coxph) regression with all patients in colchicine treatment arm (compliant ITT pgx population) in the COLCOT cohort, controlling for age, sex, principal components (C1-C10) with a threshold of 5.000E-08 (4,462,492 variants and 702 samples).

A Genome-wide Association Study (GWAS) was performed for the COLCOT primary efficacy end points. The primary efficacy endpoints were, the earliest occurrence of: cardiovascular death, resuscitated cardiac arrest, acute myocardial infarction, stroke, or urgent hospitalization for angina requiring coronary revascularization. A Manhattan plot of the GWAS is shown in FIG. 3.

Figure 4:
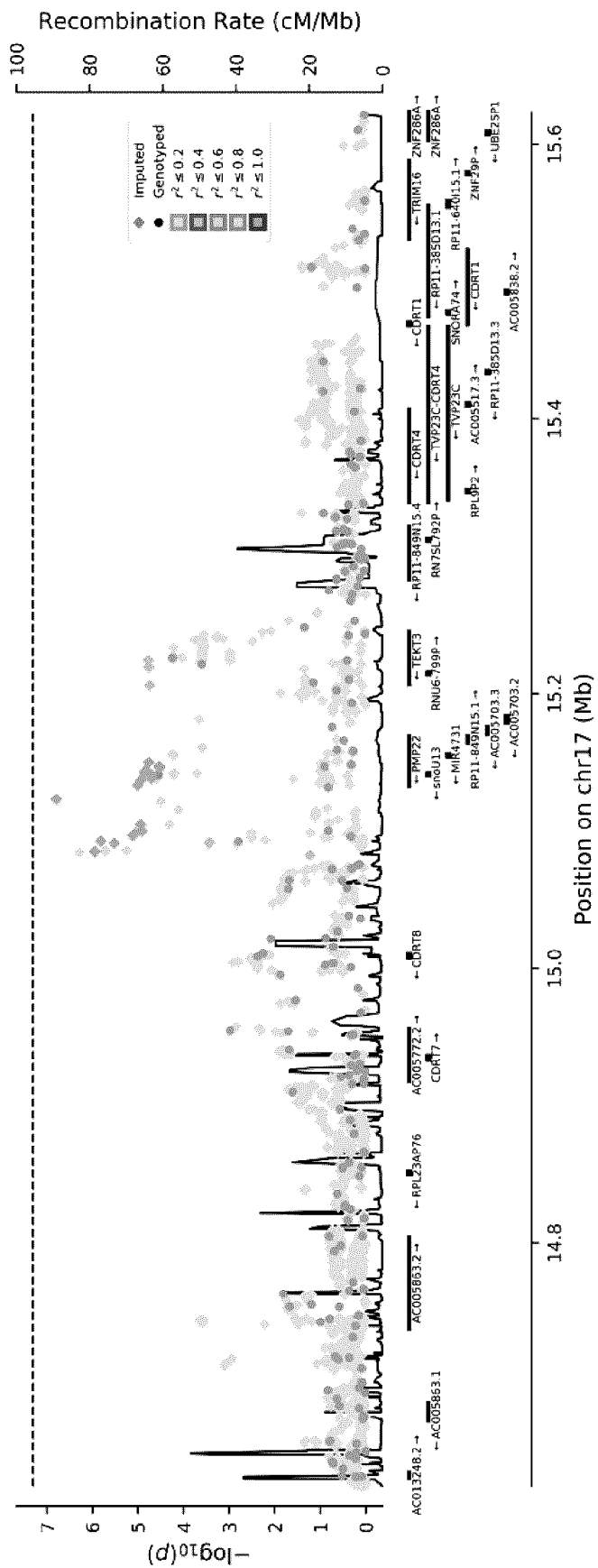
FIG. 4 is a plot of SNPs located on chromosome 17 (from 14,623,118 to 15,623,118 bp) for the primary efficacy end point using a survival analysis (coxph) regression with all patients in colchicine treatment arm (compliant ITT pgx population) in the COLCOT cohort, controlling for age, sex, principal components (C1-C10) with a threshold of 5.000E-08 (4,462,492 variants and 702 samples).

A plot of SNPs located on chromosome 17 (from 14,623, 118 to 15,623, 118 bp) for the primary efficacy end point using a survival analysis (coxph) regression with all patients in colchicine treatment arm (compliant ITT pgx population) in the COLCOT cohort is shown in FIG. 4. Within this region, SNP rs149354567 was identified for further analysis (Table 10). SNP rs149354567 is intergenic for the CDR8T (CMT1A duplicated region transcript 8) gene and the PMP22 (peripheral myelin protein 22) gene.

TABLE 10

Analysis of SNP rs149354567

| | chr | pos | region | gene | imputed | major | minor | maf | n | n_events | hr | hr_lower | hr_upper | p |
|---|---|---|---|---|---|---|---|---|---|---|---|---|---|---|
| rs149354567 | 17 | 15,123,118 | intergenic | CDRT8(dist = 113614), PMP22(dist = 99760) | yes | G | GA | 0.08 | 692 | 37 | 5.30 | 2.84 | 9.89 | 1.6E−07 |

A Cox statistical analysis for the primary endpoint comparing the chromosome 17 SNP rs149354567 minor versus major alleles by treatment arms is shown in Table 11 below.

TABLE 11

Chr 17: rs149354567
Cox for primary end point comparing SNP minor versus major alleles by treatment arms

| | | Patients with events | N total | % of events | $HR_n$ (95% CI) | P value (SNP) | Interaction P value (SNP × arm) |
|---|---|---|---|---|---|---|---|
| Colchicine | All genotypes | 37 | 689 | 5.4% | 5.30 (2.84-9.89) | $1.64 \times 10^{-7}$ | 0.047 |
| | G−/G− | 20 | 585 | 3.4% | | | |
| | G−/GA | 17 | 102 | 16.7% | | | |
| | GA/GA | 0 | 2 | — | | | |
| | G−/GA+GA/GA | 17 | 104 | 16.3% | | | |
| Placebo | All genotypes | 45 | 695 | 6.5% | 2.03 (1.11-370) | 0.02 | |
| | G−/G− | 34 | 594 | 5.7% | | | |
| | G−/GA | 10 | 94 | 10.6% | | | |
| | GA/GA | 1 | 7 | 14.3% | | | |
| | G−/GA+GA/GA | 11 | 101 | 10.9% | | | |

*In the compliant ITT pgx population, controlling for age, sex, principal components (C1-C10)

A Cox statistical analysis for the primary end point comparing colchicine versus placebo for SNP rs149354567 genotypes is shown in Table 12 below.

TABLE 12

Cox model for primary end point comparing colchicine versus placebo by rs149354567 genotypes

|  | Genotype | Group % | N Event | N total | % Events | HR (95% CI) | P-value |
|---|---|---|---|---|---|---|---|
| rs149354567 | G-/G- | 85% | 54 | 1179 | 4.6% | 0.60 (0.34-1.04) | 0.07 |
|  | G-/GA | 14% | 27 | 196 | 13.8% | 1.62 (0.72-3.62) | 0.24 |
|  | GA/GA | 1% | 1 | 9 | 11.1% | — | — |

*In the compliant ITT pgx population, controlling for age, sex, principal components (C1-C10)

The above analysis is based on time to first event among the components of the primary end point. Three other analyses were also considered to account for multiple events within subjects. These analyses make use of all events, including the ones that occur after the first. The Wei, Lin, and Weissfeld (WLW) marginal model, the Andersen and Gill (AG) model, and the negative binomial model were used. The association of SNP rs149354567 with events in each treatment arm and the various genotypes are shown in Tables 13-17 below.

TABLE 13

Association of rs149354567 with events in each treatment arm

| Recurrent Primary end point events |  | Colchicine (N = 689) | Placebo (N = 695) |
|---|---|---|---|
| Number of primary end point events per subject | n | 689 | 695 |
|  | 0 | 652 | 650 |
|  | 1 | 32 | 28 |
|  | 2 | 5 | 12 |
|  | 3 | 0 | 3 |
|  | 4 | 0 | 2 |
| At least one event |  | 37 | 45 |
| Total number of primary end point events |  | 42 | 69 |
| Total follow-up months |  | 17072 | 16911 |
| Primary end point events rate per 100 subject-months |  | 0.25 | 0.41 |

|  |  | Hazard Ratio or Rate Ratio* (95% CI) | P-value | Hazard Ratio or Rate Ratio* (95% CI) | P-value |
|---|---|---|---|---|---|
| Negative binomial model† |  | 4.58 (2.40; 8.74) | $3.73 \times 1^{-6}$ | 2.22 (0.94; 5.22) | 0.0684 |
| Andersen-Gill model† |  | 4.55 (2.45; 8.46) | $1.72 \times 10^{-6}$ | 2.15 (1.16; 4.01) | 0.0158 |
| WLW model with K = 2† | $1^{st}$ Event | 5.30 (2.90; 9.70) | $6.38 \times 10^{-8}$ | 2.03 (1.08; 3.80) | 0.0273 |
|  | $2^{nd}$ Event | 3.96 (0.99; 15.80) | 0.0515 | 2.08 (0.92; 4.70) | 0.0791 |
|  | Average | 5.28 (2.88; 9.66) | $6.77 \times 10^{-8}$ | 2.04 (1.10; 3.76) | 0.0227 |

*for one unit increase of SNP dosage
†controlling for age, sex and principal components (C1-C10)

TABLE 14

All genotypes (G/G + G/GA + GA/GA)

| Recurrent Primary end point events |  | Colchicine (N = 689) | Placebo (N = 695) |
|---|---|---|---|
| Number of primary end point events per subject | n | 689 | 695 |
|  | 0 | 652 | 650 |
|  | 1 | 32 | 28 |
|  | 2 | 5 | 12 |
|  | 3 | 0 | 3 |
|  | 4 | 0 | 2 |
| At least one event |  | 37 | 45 |
| Total number of primary end point events |  | 42 | 69 |
| Total follow-up months |  | 17072 | 16911 |
| Primary end point events rate per 100 subject-months |  | 0.25 | 0.41 |

|  | Hazard Ratio or Rate Ratio* (95% CI) | P-value |
|---|---|---|
| Negative binomial model† | 0.57 (0.34; 0.94) | 0.0287 |
| Andersen-Gill model† | 0.61 (0.39; 0.96) | 0.0327 |

TABLE 14-continued

| All genotypes (G/G + G/GA + GA/GA) | | | |
|---|---|---|---|
| WLW model with K = 2† | 1$^{st}$ Event | 0.82 (0.53; 1.28) | 0.3895 |
| | 2$^{nd}$ Event | 0.28 (0.10; 0.73) | 0.0097 |
| | Average | 0.80 (0.52; 1.25) | 0.3275 |

TABLE 15

In individuals with the genotype G/G

| Recurrent Primary end point events | | Colchicine (N = 585) | Placebo (N = 594) |
|---|---|---|---|
| Number of primary end point events per subject | n | 585 | 594 |
| | 0 | 565 | 560 |
| | 1 | 17 | 21 |
| | 2 | 3 | 10 |
| | 3 | 0 | 3 |
| | 4 | 0 | 0 |
| At least one event | | 20 | 34 |
| Total number of primary end point events | | 23 | 50 |
| Total follow-up months | | 14370 | 14394 |
| Primary end point events rate per 100 subject-months | | 0.16 | 0.35 |

| | | Hazard Ratio or Rate Ratio* (95% CI) | P-value |
|---|---|---|---|
| Negative binomial model† | | 0.43 (0.23; 0.82) | 0.0108 |
| Andersen-Gill model† | | 0.48 (0.27; 0.85) | 0.0120 |
| WLW model with K = 2† | 1$^{st}$ Event | 0.60 (0.34; 1.04) | 0.0696 |
| | 2$^{nd}$ Event | 0.25 (0.07; 0.85) | 0.0259 |
| | Average | 0.59 (0.34; 1.03) | 0.0631 |

TABLE 16

In individuals with the genotype G/GA

| Recurrent Primary end point events | | Colchicine (N = 102) | Placebo (N = 94) |
|---|---|---|---|
| Number of primary end point events per subject | n | 102 | 94 |
| | 0 | 85 | 84 |
| | 1 | 15 | 6 |
| | 2 | 2 | 2 |
| | 3 | 0 | 0 |
| | 4 | 0 | 2 |
| At least one event | | 17 | 10 |
| Total number of primary end point events | | 19 | 18 |
| Total follow-up months | | 2678 | 2362 |
| Primary end point events rate per 100 subject-months | | 0.71 | 0.76 |

| | | Hazard Ratio or Rate Ratio* (95% CI) | P-value |
|---|---|---|---|
| Negative binomial model† | | 0.91 (0.39; 2.08) | 0.8168 |
| Andersen-Gill model† | | 0.84 (0.34; 2.11) | 0.7158 |
| WLW model with K = 2† | 1$^{st}$ Event | 1.62 (0.69; 3.79) | 0.2689 |
| | 2$^{nd}$ Event | 0.17 (0.03; 1.02) | 0.0531 |
| | Average | 1.35 (0.58; 3.12) | 0.4884 |

TABLE 17

In individuals with the genotype GA/GA (not sufficient for analysis)

| Recurrent Primary end point events | | Colchicine (N = 2) | Placebo (N = 7) |
|---|---|---|---|
| Number of primary end point events per subject | n | 2 | 7 |
| | 0 | 2 | 6 |
| | 1 | 0 | 1 |
| | 2 | 0 | 0 |
| | 3 | 0 | 0 |
| | 4 | 0 | 0 |
| At least one event | | 0 | 1 |
| Total number of primary end point events | | 0 | 1 |

TABLE 17-continued

In individuals with the genotype GA/GA (not sufficient for analysis)

| Recurrent Primary end point events | Colchicine (N = 2) | Placebo (N = 7) |
|---|---|---|
| Total follow-up months | 24 | 155 |
| Primary end point events rate per 100 subject-months | 0 | 0.64 |

The above analyses identified a region of the genome with a genetic variant, rs149354567, that is associated with efficacy of colchicine in the prevention of cardiovascular events in participants recruited within 30 days of a myocardial infarction (acute coronary syndrome). rs149354567 was associated with the primary efficacy endpoint of COLCOT (composite of cardiovascular death, resuscitated cardiac arrest, myocardial infarction, stroke, or urgent hospitalization for angina requiring coronary revascularization) in the colchicine treatment arm ($P=1.6 \times 10^{-7}$). When looking only at study participants that are carriers of 2 copies of the protective genetic variant (genotype G-/G-at rs149354567 (85% of the population)), those individuals had 40% fewer cardiovascular events when treated with colchicine compared to placebo (n=1179, HR=0.60, P=0.07) (recurrent event model HR=0.48, P=0.01). There was no evidence of benefit of colchicine in the prevention of cardiovascular events in participants without 2 copies of the protective genetic variant (n=196, HR=1.6, P=0.24).

Figure 8:
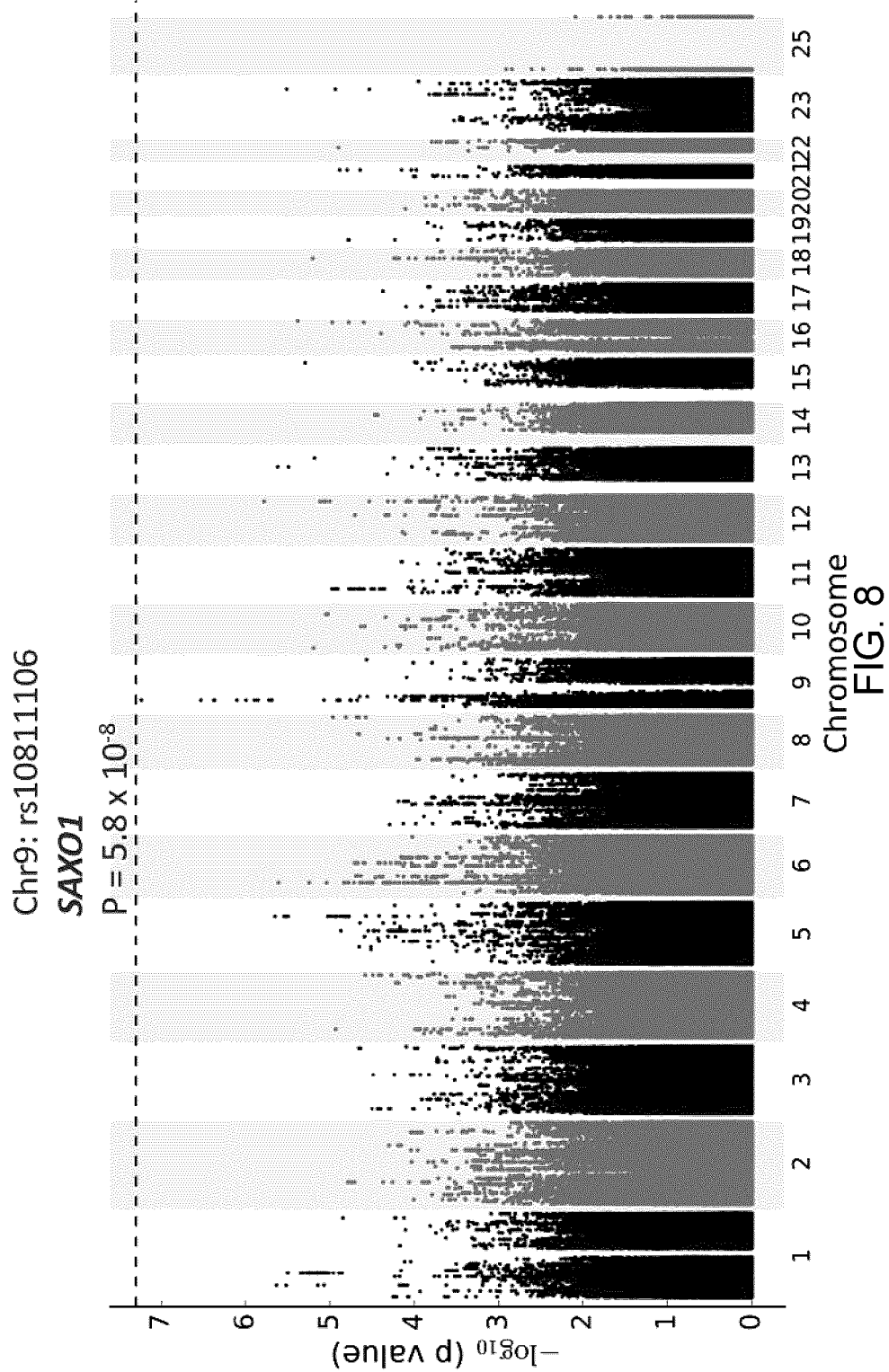
FIG. 8 is a Manhattan plot of GWAS with common SNPs with MAF≥5% for the primary efficacy endpoint using a survival analysis (coxph) regression with male patients in colchicine treatment arm (compliant ITT pgx population) in the COLCOT cohort, controlling for age, sex specific principal components (SC1-SC10) with a threshold of 5.000E-08 (4,455,743 variants and 576 samples).
Figure 9:
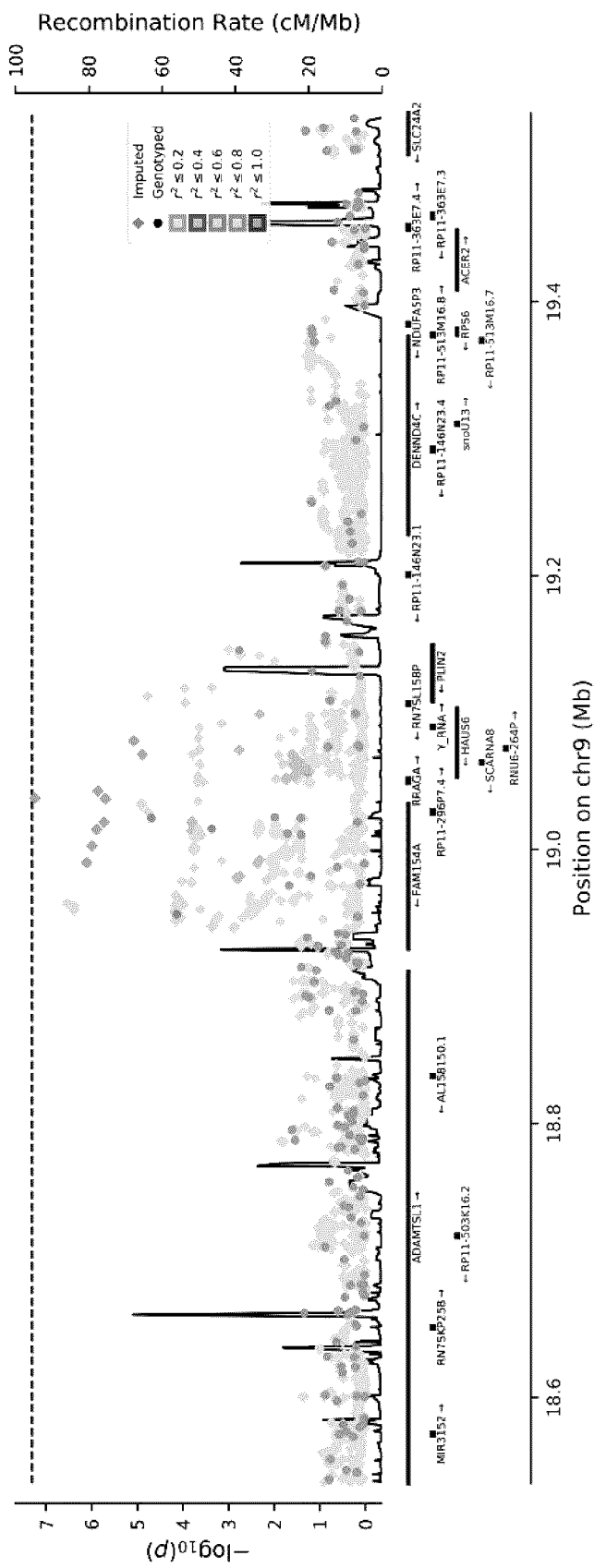
FIG. 9 is a plot of single-nucleotide polymorphisms (SNPs) located on chromosome 9 (from 18,537,533 to 19,537,533 bp) for primary efficacy endpoint using a survival analysis (coxph) regression with male patients in colchicine treatment arm (compliant ITT pgx population) in the COLCOT cohort, controlling for age, sex specific principal components (SC1-SC10) with a threshold of 5.000E-08 (4,455,743 variants and 576 samples).
Figure 10A:
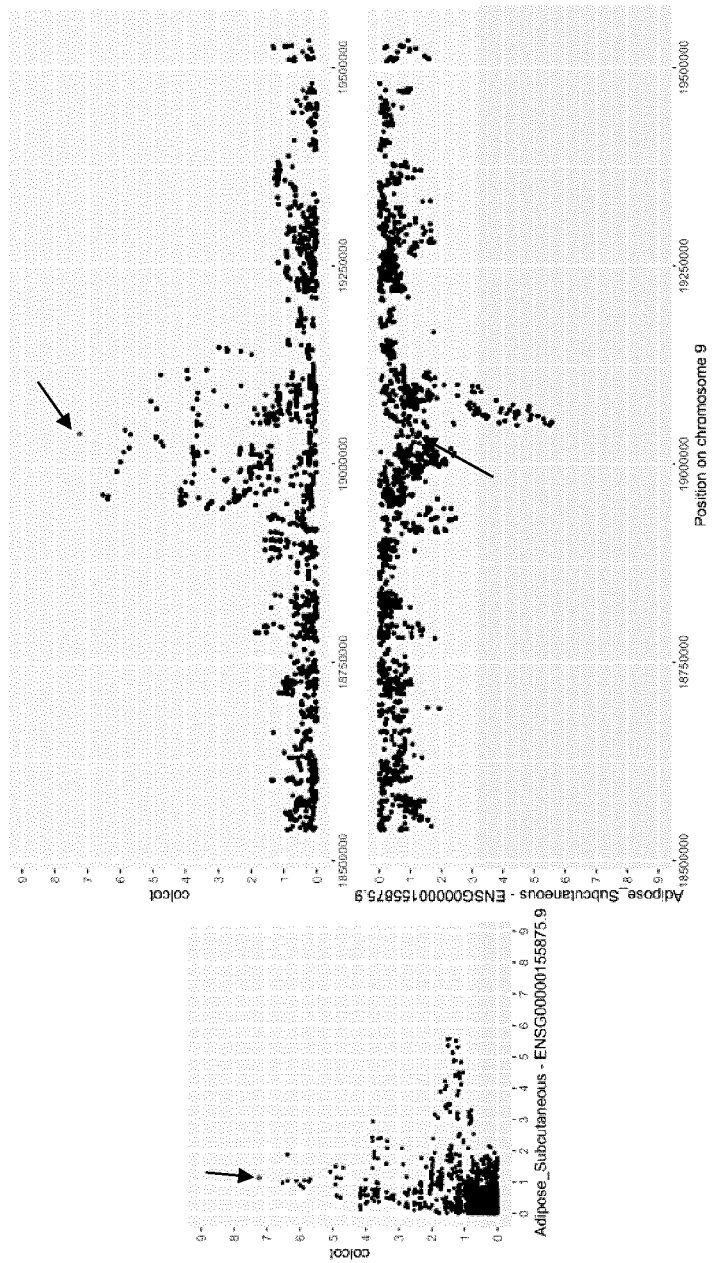
FIG. 10A is a series of graphs showing colocalization at the chromosome 9:18,537,533-19,537,533 locus between the primary cardiovascular endpoint in males in the colchicine group of the COLCOT trial and gene expression of the SAXO1 (FAM154A) gene in subcutaneous adipose tissue (GTEx data) (PP H4 0.10, PP H3 0.16). The most probable hypothesis according to COLOC is H2 PP=0.58 (testing an association signal in the gene expression data and none in the COLCOT summary statistics). The red dot (arrows) corresponds to the lead variant for this locus in the COLCOT GWAS.
Figure 10B:
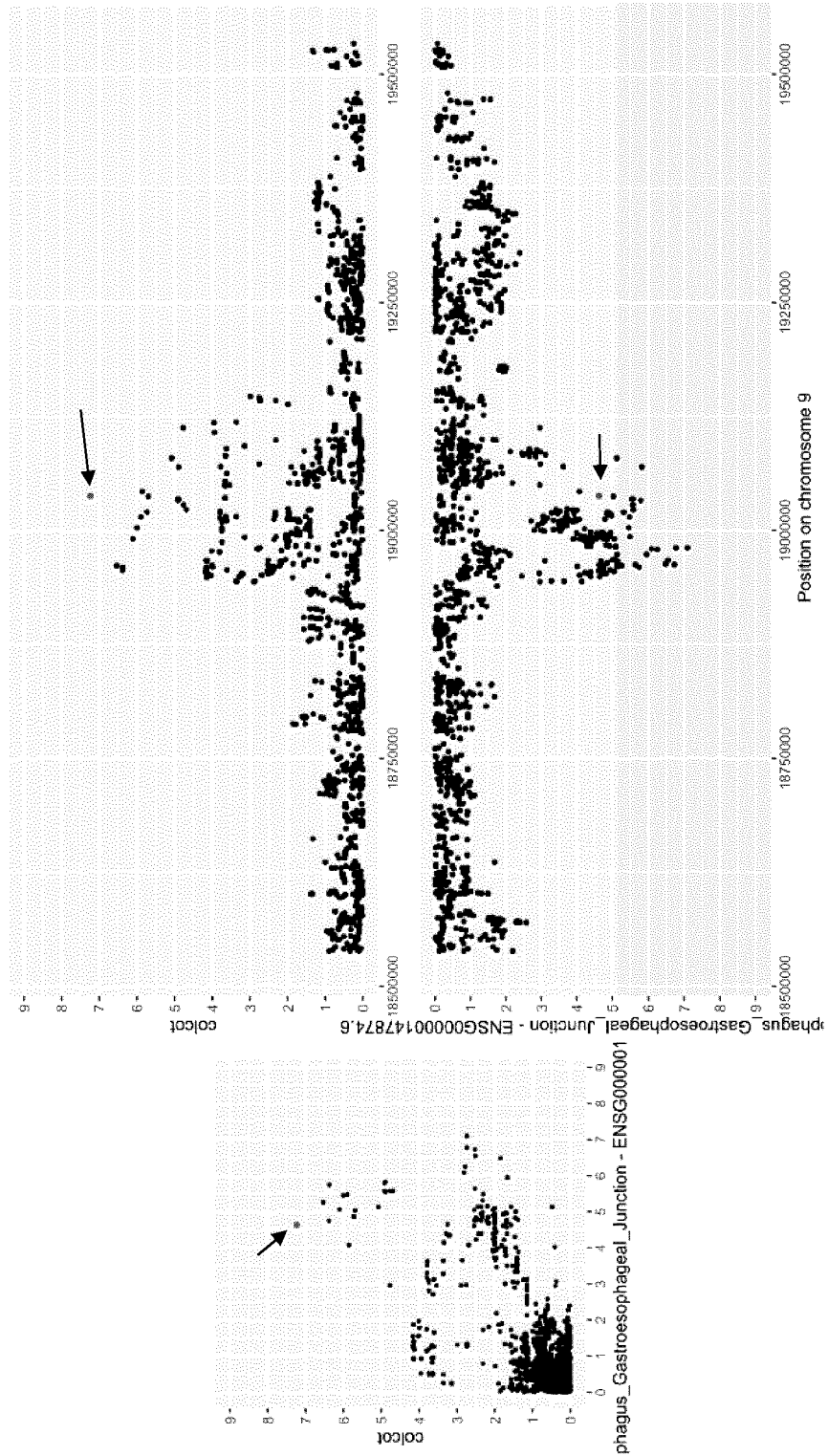
FIG. 10B is a series of graphs showing colocalization at the chromosome 9:18,537,533-19,537,533 locus between the primary cardiovascular endpoint in males in the colchicine group of the COLCOT trial and gene expression of the HAUS6 gene in gastroesophageal junction tissue (GTEx data) (PP H4=0.24, PP H3=0.15). The most probable hypothesis according to COLOC is H2 PP=0.57. The red dot (arrows) corresponds to the lead SNP for this locus in the COLCOT GWAS.
Figure 10C:
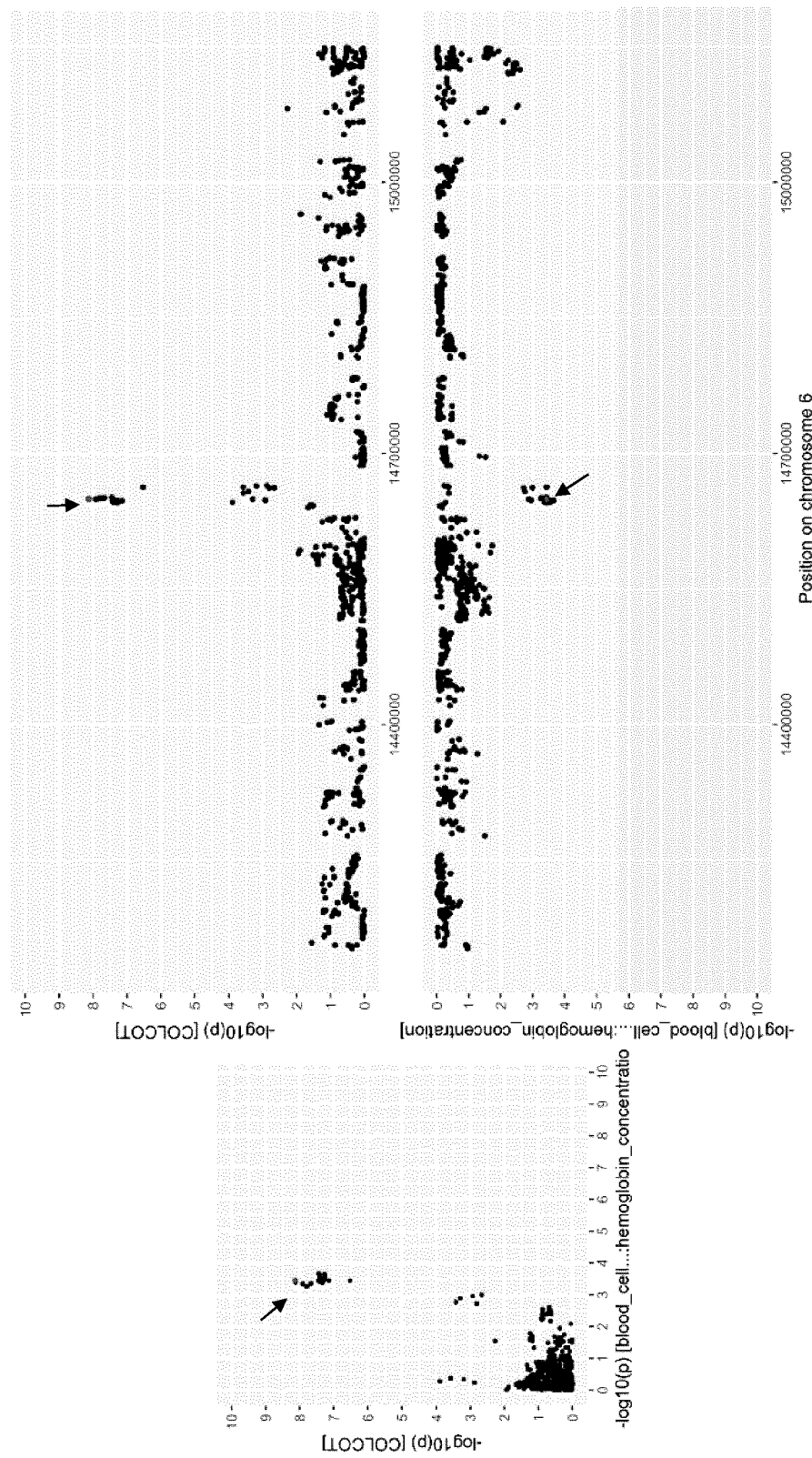
FIG. 10C is a series of graphs showing colocalization at the chromosome 6:14, 149,353-15, 149,353 locus between gastrointestinal disorder in the colchicine group of the COLCOT trial and hemoglobin concentration association statistics from the Blood Cell Traits GWAS by Astle et al. (2016) (PP H4=0.55). The red dot (arrows) corresponds to the lead SNP for this locus in the COLCOT GWAS.
Figure 10D:
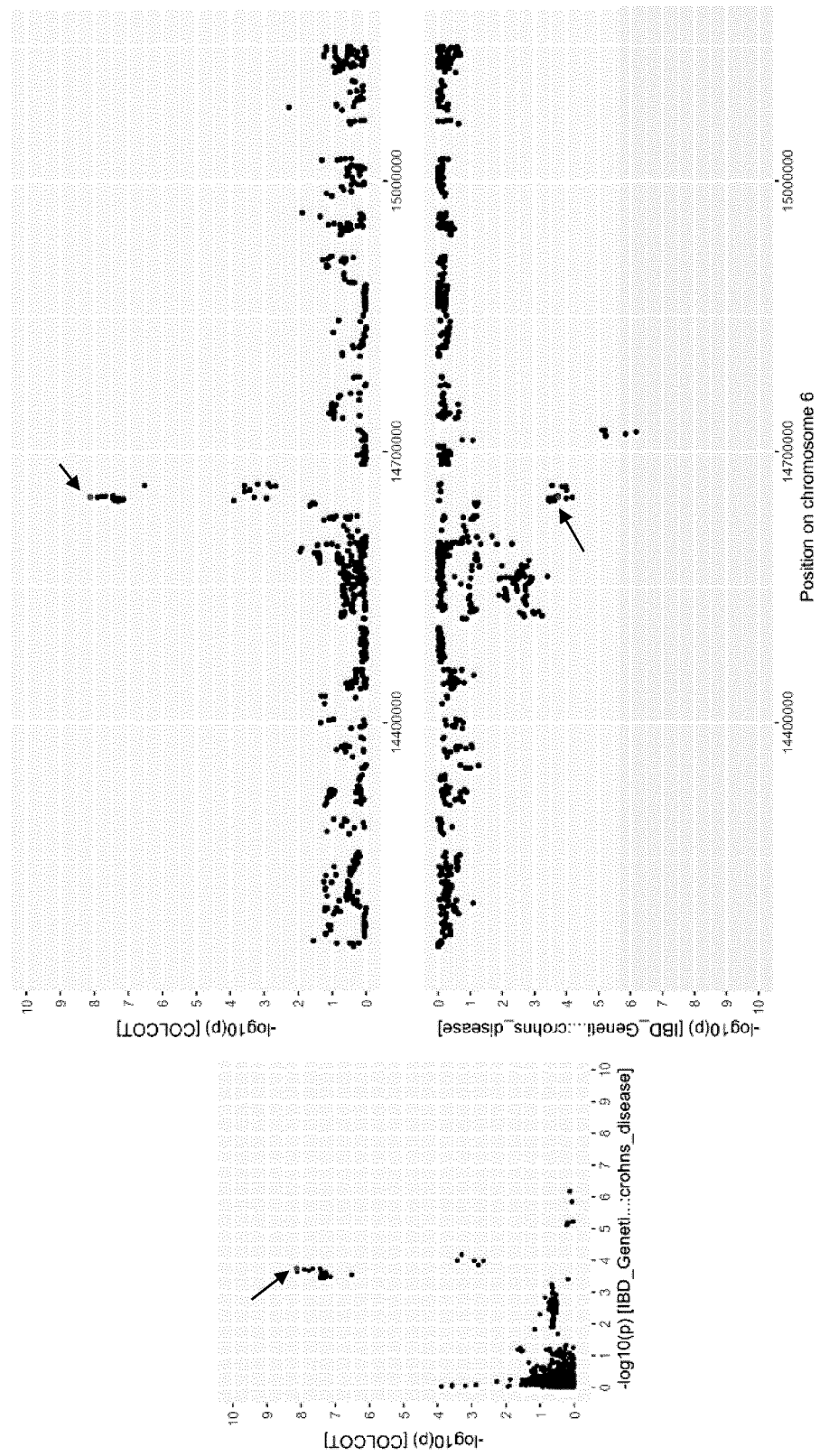
FIG. 10D is a series of graphs showing colocalization at the chromosome 6:14, 149,353-15,149,353 locus between gastrointestinal disorder in the colchicine arm of the COLCOT trial and Crohn's disease association statistics from IBD Genetics Consortium (PP H4=0.57). The red dot (arrows) indicates the lead SNP in the COLCOT GWAS.
Figure 10E:
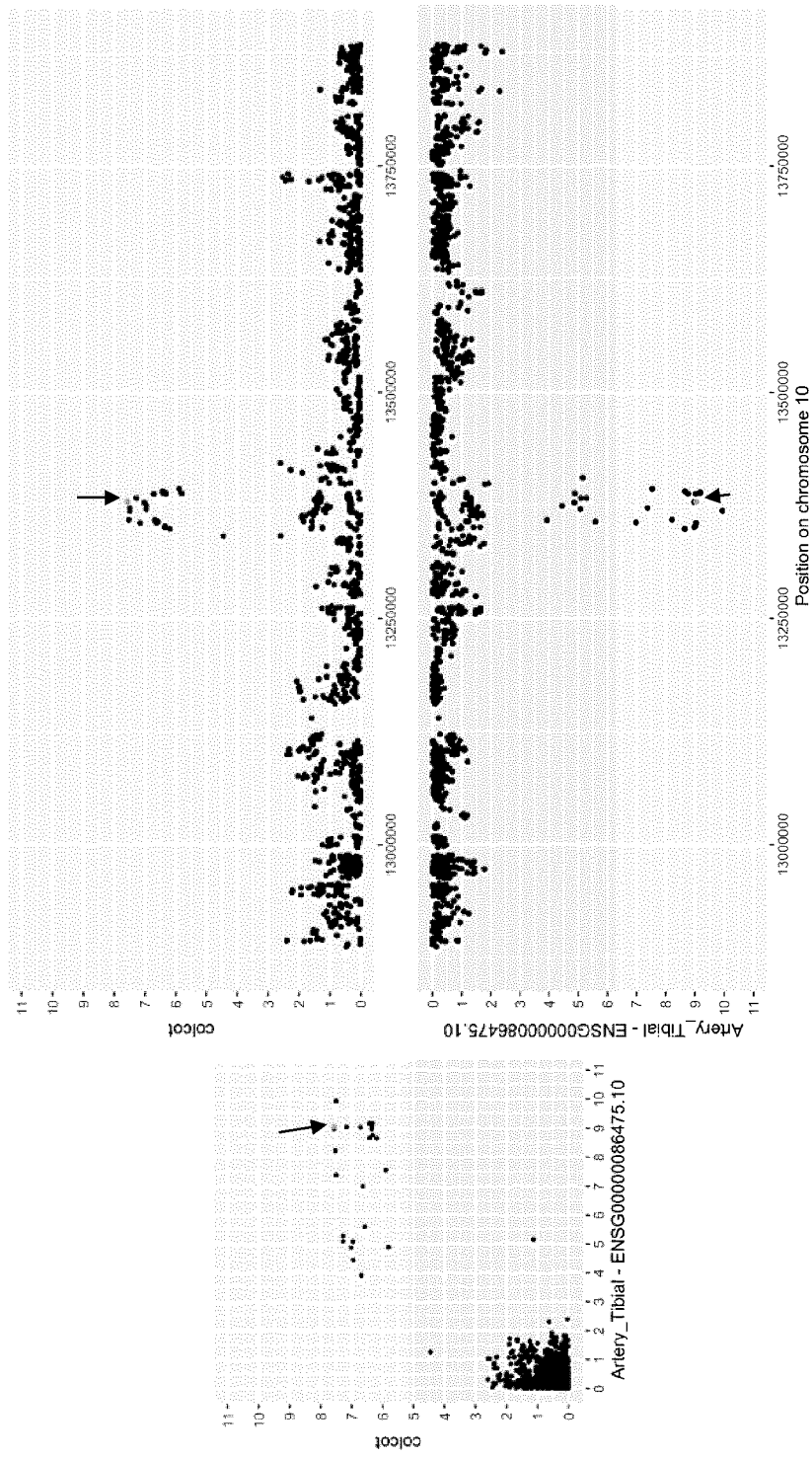
FIG. 10E is a series of graphs showing colocalization at the chromosome 10:12,884,400-13,884,400 locus between gastrointestinal disorder in the colchicine group of the COLCOT trial and gene expression of the SEPHS1 gene in tissue from the tibial artery (GTEx data) (PP H4=0.98, PP H3=0.05). The orange dot (arrows) represents a tag SNP (rs61851593) highly correlated with the lead SNP (rs74795203) at this locus ($r^2$=1 in 1000 Genomes, Europeans).

A further region of the genome with a genetic variant, rs10811106, that, in males, is associated with efficacy of colchicine in the prevention of cardiovascular events in participants recruited within 30 days of a myocardial infarction (acute coronary syndrome) was identified using similar statistical analyses (FIG. 8). SNP rs10811106 is intronic in the SAXO1 (stabilizer of axonemal microtubules 1) gene (FIG. 9). SNP rs10811106 was associated with the primary efficacy endpoint of COLCOT (composite of cardiovascular death, resuscitated cardiac arrest, myocardial infarction, stroke, or urgent hospitalization for angina requiring coronary revascularization) in the colchicine treatment arm ($P=5.8 \times 10^{-8}$).

When looking only at study participants that are carriers of 2 copies of the protective genetic variant (genotype C/C at rs10811106 (83% of the population)), those individuals had 54% fewer cardiovascular events when treated with colchicine compared to placebo (n=941, HR=0.46, 95% CI: 0.24-0.86, P=0.01). There was no evidence of benefit of colchicine in the prevention of cardiovascular events in participants without 2 copies of the protective genetic variant (n=194, HR=3.15, 95% CI: 1.17-8.45, P=0.02) (Table 18 below).

TABLE 18

Cox proportional hazard model for the primary end point in males, comparing colchicine versus placebo by rs10811106 genotypes

| Events | SNP | Genotype | Group % | N Total | N Events | % Events | HR (95% CI) | P-value |
|---|---|---|---|---|---|---|---|---|
| Primary end point in males only | rs10811106 | CC | 83% | 941 | 45 | 4.8% | 0.46 (0.24-0.86) | 0.01 |
| | | CT | 16% | 182 | 21 | 11.5% | 2.49 (0.92-6.75) | 0.07 |
| | | TT | 1% | 12 | 1 | 8.3% | — | — |
| | | CT+TT | 17% | 194 | 22 | 11.3% | 3.15 (1.17-8.45) | 0.02 |

*In the compliant ITT pgx population, controlling for age, principal components (C1-C10)

Additional SNPs associated with the primary endpoint are provided in Table 19 below.

TABLE 19

| snp | chr | pos | region | gene | Other allele | Effect allele | Effect allele frequency | n |
|---|---|---|---|---|---|---|---|---|
| SNPs associated with primary end point in males + females: | | | | | | | | |
| rs75780450 | 17 | 15,084,908 | intergenic | CDRT8 (dist = 75404), PMP22 (dist = 48186) | C | T | 0.0799 | 691 |
| rs149354567 | 17 | 15,123,118 | intergenic | CDRT8 (dist = 113614), PMP22 (dist = 9976) | G | GA | 0.077 | 689 |
| SNPs associated with primary end point in males only: | | | | | | | | |
| rs10118790 | 9 | 18,956,032 | intronic | SAXO1 | G | A | 0.0927 | 573 |
| rs28733572 | 9 | 18,959,532 | intronic | SAXO1 | G | C | 0.0927 | 572 |
| rs1854156 | 9 | 18,961,304 | intronic | SAXO1 | G | C | 0.0901 | 572 |
| rs10963895 | 9 | 18,990,659 | intronic | SAXO1 | G | A | 0.0962 | 572 |
| rs10811106 | 9 | 19,037,533 | intronic | SAXO1 | C | T | 0.0896 | 564 |

TABLE 19-continued

| snp | n_events | coef | se | hr | hr_lower | hr_upper | P value |
|---|---|---|---|---|---|---|---|
| SNPs associated with primary end point in males + females: | | | | | | | |
| rs75780450 | 39 | 1.5284 | 0.305 | 4.611 | 2.5378 | 8.3767 | 5.30E−07 |
| rs149354567 | 37 | 1.6674 | 0.319 | 5.299 | 2.8385 | 9.891 | 1.60E−07 |
| SNPs assodated with primary end point in males only: | | | | | | | |
| rs10118790 | 30 | 1.6194 | 0.32 | 5.05 | 2.6975 | 9.4546 | 4.20E−07 |
| rs28733572 | 30 | 1.618 | 0.32 | 5.043 | 2.694 | 9.4401 | 4.20E−07 |
| rs1854156 | 30 | 1.63 | 0.318 | 5.104 | 2.7371 | 9.5167 | 2.90E−07 |
| rs10963895 | 30 | 1.433 | 0.29 | 4.191 | 2.3732 | 7.4018 | 7.90E−07 |
| rs10811106 | 30 | 1.7052 | 0.314 | 5.503 | 2.9719 | 10.1887 | 5.80E−08 |

Figure 5:
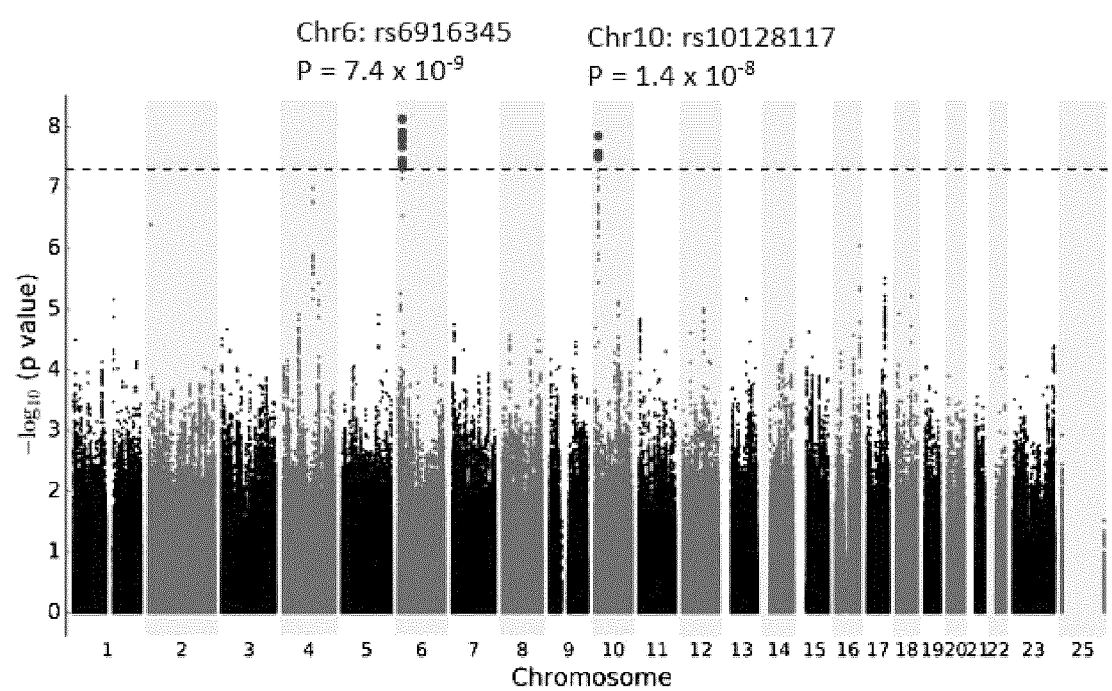
FIG. 5 is a Manhattan plot of a GWAS with common SNPs with MAF≥5% for gastrointestinal disorders using a survival analysis (coxph) regression with all patients in colchicine treatment arm (on-treatment pgx population) in the COLCOT cohort, controlling for age, sex, principal components (C1-C10) with a threshold of 5.000E-08 (4,468,817 variants and 767 samples).

Two regions of the genome with genetic variants that are potentially associated with a common adverse effect of colchicine, namely, gastrointestinal disorders were identified using statistical analyses. A GWAS for COLCOT gastrointestinal disorders was performed, and a Manhattan plot of the GWAS is shown in FIG. 5.

Figure 6:
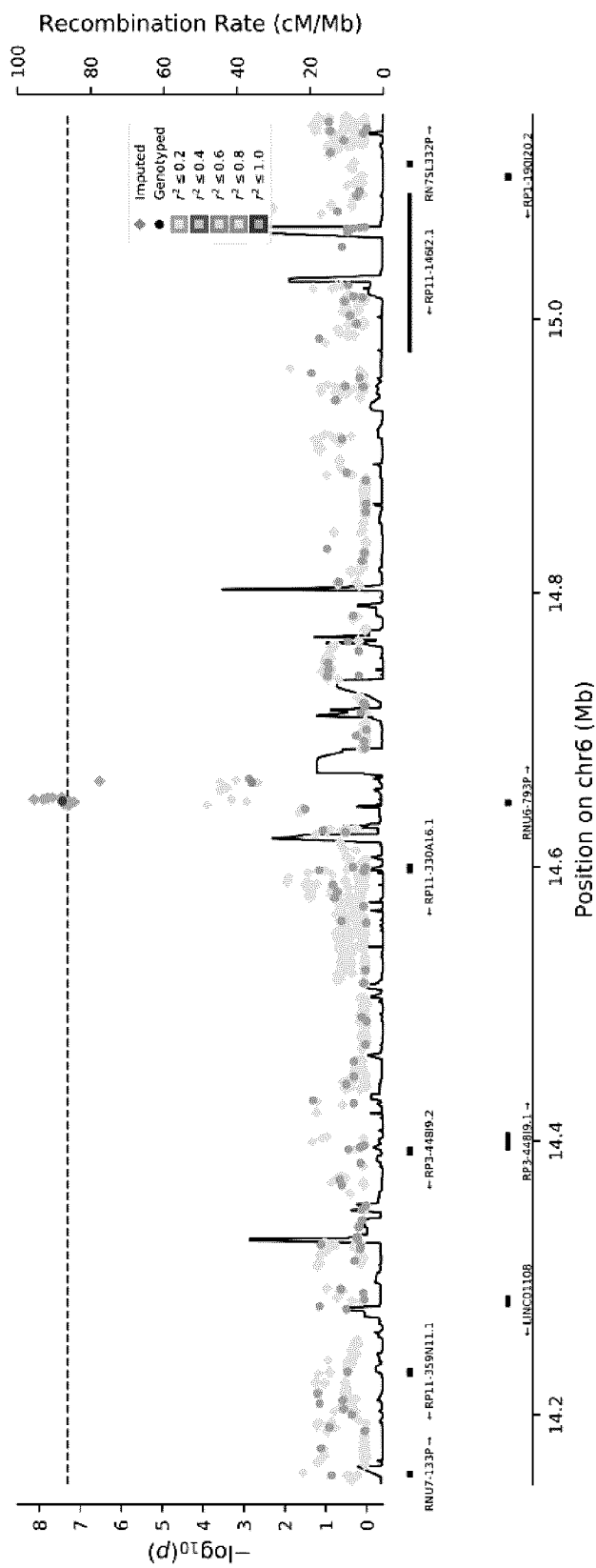
FIG. 6 is a plot of single-nucleotide polymorphisms (SNPs) located on chromosome 6 (from 14,149,353 to 15,149,353 bp) for gastrointestinal disorders using a survival analysis (coxph) regression with all patients in colchicine treatment arm (on-treatment pgx population) in the COLCOT cohort, controlling for age, sex, principal components (C1-C10) with a threshold of 5.000E-08 (4,468,817 variants and 767 samples).

A plot of single-nucleotide polymorphisms (SNPs) located on chromosome 6 (from 14,149,353 to 15,149,353 bp) for gastrointestinal disorders using a survival analysis (coxph) regression with all patients in colchicine treatment arm (on-treatment pgx population) in the COLCOT cohort is shown in FIG. 6.

Figure 7:
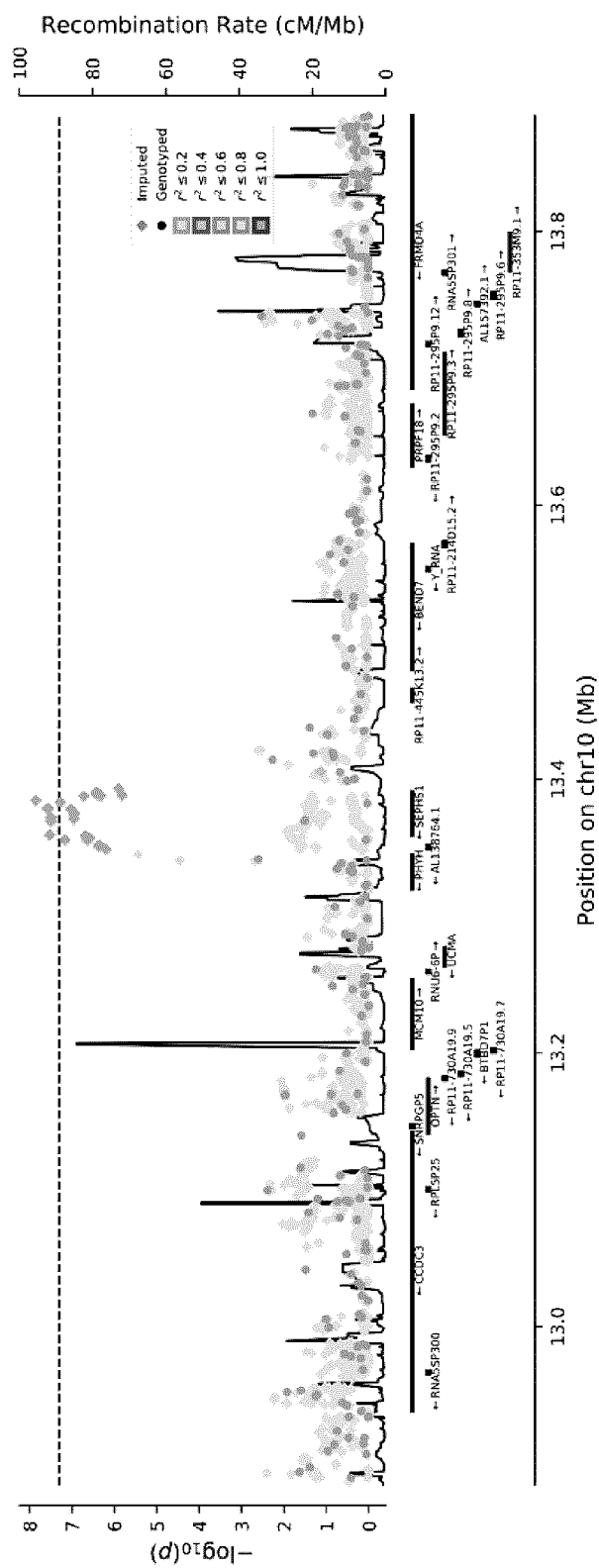
FIG. 7 is a plot of single-nucleotide polymorphisms (SNPs) located on chromosome 10 (from 12,884,400 to 13,884,400 bp) for gastrointestinal disorders using a survival analysis (coxph) regression with all patients in colchicine treatment arm (on-treatment pgx population) in the COLCOT cohort, controlling for age, sex, principal components (C1-C10) with a threshold of 5.000E-08 (4,468,817 variants and 767 samples).

A plot of single-nucleotide polymorphisms (SNPs) located on chromosome 10 (from 12,884,400 to 13,884,400 bp) for gastrointestinal disorders using a survival analysis (coxph) regression with all patients in colchicine treatment arm (on-treatment pgx population) in the COLCOT cohort is shown in FIG. 7.

Two SNPs (rs6916345 and rs10128117) were identified for further analysis (Table 20). SNP rs6916345 is intergenic for the LINC01108 (long intergenic non-coding RNA 1108) gene and the JARID2 (Jumonji and AT-rich interaction domain containing 2) gene. SNP rs 10128117 in intronic in the SEPHS1 (selenophosphate synthetase 1) gene.

TABLE 20

| snp | chr | pos | region | gene | imputed | major | minor | maf | n | n_events | hr | hr_lower | hr_upper | p |
|---|---|---|---|---|---|---|---|---|---|---|---|---|---|---|
| 16916345 | 6 | 14,649,353 | intergenic | LINC01108, JARID2 | yes | A | G | 0.50 | 751 | 183 | 0.53 | 0.43 | 0.66 | 7.4E−09 |
| rs10128117 | 10 | 13,384,400 | intronic | SEPHS1 (eQTL) | yes | T | A | 0.06 | 762 | 187 | 2.55 | 1.84 | 3.52 | 1.4E−08 |

A Cox statistical analysis for risk of gastrointestinal events comparing SNP minor versus major alleles by treatment arts was performed for rs6916345 and rs10128117. The results are shown in Table 21 below.

TABLE 21

Cox for risk of GID events comparing SNP minor versus major alleles by treatment arms

| CHR | SNP | Group | Parameter | N Events | N total | % Events | HR (95% CI) | P-value |
|---|---|---|---|---|---|---|---|---|
| 6 | rs6916345:G | Colchicine | SNP | 183 | 751 | 24.4% | 0.53 (0.43-0.66) | 7.41E−09 |
| | | Placebo | SNP | 168 | 741 | 22.7% | 0.77 (0.62-0.96) | 0.019 |
| | | Col + Placebo | SNP*ARM | 351 | 1492 | 23.5% | | 2.96E−08 |
| 10 | rs10128117:A | Colchicine | SNP | 187 | 762 | 24.5% | 2.55 (1.84-3.52) | 1.41E−08 |
| | | Placebo | SNP | 173 | 746 | 23.2% | 0.73 (0.48-1.13) | 0.159 |
| | | Col + Placebo | SNP*ARM | 360 | 1508 | 23.9% | | 3.86E−06 |

For the on-treatment pgx population, controlling for age, sex, C1-C10

A Cox proportional hazard of risk of gastrointestinal events with colchicine versus placebo, by genotypes, was performed. The results are shown in Table 22 below.

TABLE 22

Cox proportional hazard for risk of GID events with colchicine versus placebo, by genotypes

| CHR | SNP | Genotype | Group % | N total | N Events | % Events | HR (95% CI) | P-value |
|---|---|---|---|---|---|---|---|---|
| 6 | rs6916345 | A/A | 25% | 367 | 104 | 28.3% | 2.42 (1.57-3.72) | 5.77E−05 |
| | | G/A | 50% | 742 | 167 | 22.5% | 1.08 (0.80-1.47) | 0.61 |
| | | G/G | 25% | 383 | 80 | 20.9% | 0.43 (0.26-0.69) | 5.45E−04 |

TABLE 22-continued

Cox proportional hazard for risk of GID events with colchicine versus placebo, by genotypes

| CHR | SNP | Genotype | Group % | N total | N Events | % Events | HR (95% CI) | P-value |
|---|---|---|---|---|---|---|---|---|
| 10 | rs10128117 | T/T | 87% | 1317 | 299 | 22.7% | 0.88 (0.70-1.11) | 0.27 |
| | | T/A | 12% | 182 | 59 | 32.4% | 3.72 (2.09-6.61) | 7.87E−06 |
| | | A/A | 1% | 9 | 2 | 22.2% | — | — |

For the on-treatment pgx population, controlling for age, sex, C1-C10

The above analyses identified a genetic variant on chromosome 6, rs6916345, that was associated (P=7.4×10$^{-9}$) with gastrointestinal disorder in the colchicine treatment arm. When looking only at study participants carriers of 2 copies of the risk genetic variant (genotype A/A at rs6916345 (25% of the population)), those individuals were 2.4 times more likely to have reported gastrointestinal disorders with colchicine than with placebo (HR=2.42, P=0.00006). Carriers of 2 copies of the protective genetic variant (genotype G/G at rs6916345 (25% of the population)) were 57% less likely to have reported gastrointestinal disorders with colchicine than with placebo (HR=0.43, P=0.0005).

Additional SNPs on chromosome 6 associated with gastrointestinal disorders are provided in Table 23 below.

TABLE 23

SNPs associated with gastrointestinal disorders in males + females:

| snp | chr | pos | region | gene | Other allele | Effect allele | Effect allele frequency | n |
|---|---|---|---|---|---|---|---|---|
| rs9476615 | 6 | 14,645,084 | intergenic | LINC01108(dist = 359399), JARID2(dist = 601122) | C | T | 0.4863 | 760 |
| rs9464702 | 6 | 14,645,574 | intergenic | LINC01108(dist = 359889), JARID2(dist = 600632) | A | G | 0.4856 | 762 |
| rs9370772 | 6 | 14,645,843 | intergenic | LINC01108(dist = 360158), JARID2(dist = 600363) | C | T | 0.4855 | 761 |
| rs6918045 | 6 | 14,645,927 | intergenic | LINC01108(dist = 360242), JARID2(dist = 600279) | C | T | 0.4861 | 760 |
| rs6459368 | 6 | 14,646,111 | intergenic | LINC01108(dist = 360426), JARID2(dist = 600095) | G | A | 0.4867 | 759 |
| rs6903188 | 6 | 14,646,772 | intergenic | LINC01108(dist = 361087), JARID2(dist = 599434) | A | G | 0.4868 | 758 |
| rs9476616 | 6 | 14,646,920 | intergenic | LINC01108(dist = 361235), JARID2(dist = 599286) | C | G | 0.4863 | 754 |
| rs12210439 | 6 | 14,647,026 | intergenic | LINC01108(dist = 361341), JARID2(dist = 599180) | G | A | 0.4858 | 764 |
| rs9358042 | 6 | 14,647,409 | intergenic | LINC01108(dist = 361724), JARID2(dist = 598797) | C | T | 0.4873 | 757 |
| rs4620126 | 6 | 14,647,726 | intergenic | LINC01108(dist = 362041), JARID2(dist = 598480) | A | G | 0.489 | 759 |
| rs7747013 | 6 | 14,647,764 | intergenic | LINC01108(dist = 362079), JARID2(dist = 598442) | A | G | 0.4876 | 767 |
| rs7751771 | 6 | 14,648,171 | intergenic | LINC01108(dist = 362486), JARID2(dist = 598035) | T | C | 0.4875 | 766 |
| rs7764937 | 6 | 14,648,227 | intergenic | LINC01108(dist = 362542), JARID2(dist = 597979) | G | C | 0.4867 | 764 |
| rs9382993 | 6 | 14,649,312 | intergenic | LINC01108(dist = 363627), JARID2(dist = 596894) | T | C | 0.4973 | 752 |
| rs6916345 | 6 | 14,649,353 | intergenic | LINC01108(dist = 363668), JARID2(dist = 596853) | A | G | 0.4971 | 751 |
| rs6920905 | 6 | 14,649,383 | intergenic | LINC01108(dist = 363698), JARID2(dist = 596823) | T | C | 0.4979 | 751 |
| rs70993041 | 6 | 14,650,151 | intergenic | LINC01108(dist = 364466), JARID2(dist = 596055) | T | TAA | 0.4963 | 742 |
| rs9349955 | 6 | 14,650,459 | intergenic | LINC01108(dist = 364774), JARID2(dist = 595747) | C | T | 0.4951 | 740 |
| rs2327827 | 6 | 14,650,754 | intergenic | LINC01108(dist = 365069), JARID2(dist = 595452) | A | G | 0.4978 | 743 |
| rs9358044 | 6 | 14,651,050 | intergenic | LINC01108(dist = 365365), JARID2(dist = 595156) | A | T | 0.4967 | 748 |
| rs857414 | 6 | 14,662,638 | intergenic | LINC01108(dist = 376953), JARID2(dist = 583568) | T | G | 0.4804 | 751 |

| snp | n_events | coef | se | hr | hr_lower | hr_upper | P value |
|---|---|---|---|---|---|---|---|
| rs9476615 | 187 | −0.594 | 0.109 | 0.6 | 0.4458 | 0.6835 | 5.10E−08 |
| rs9464702 | 187 | −0.593 | 0.109 | 0.6 | 0.4465 | 0.6847 | 5.50E−08 |
| rs9370772 | 186 | −0.595 | 0.109 | 0.6 | 0.4451 | 0.6833 | 5.30E−08 |
| rs6918045 | 186 | −0.598 | 0.109 | 0.6 | 0.444 | 0.6817 | 4.70E−08 |
| rs6459368 | 186 | −0.602 | 0.11 | 0.5 | 0.4417 | 0.6789 | 4.00E−08 |
| rs6903188 | 185 | −0.598 | 0.109 | 0.6 | 0.4441 | 0.6816 | 4.60E−08 |
| rs9476616 | 182 | −0.607 | 0.11 | 0.5 | 0.4392 | 0.6767 | 3.80E−08 |
| rs12210439 | 187 | −0.594 | 0.109 | 0.6 | 0.4458 | 0.6834 | 5.00E−08 |
| rs9358042 | 184 | −0.589 | 0.109 | 0.6 | 0.4476 | 0.6873 | 7.20E−08 |
| rs4620126 | 184 | −0.594 | 0.109 | 0.6 | 0.4456 | 0.6839 | 5.40E−08 |
| rs7747013 | 187 | −0.6 | 0.109 | 0.5 | 0.4436 | 0.6797 | 3.70E−08 |
| rs7751771 | 187 | −0.598 | 0.109 | 0.5 | 0.4441 | 0.6804 | 3.80E−08 |
| rs7764937 | 186 | −0.599 | 0.109 | 0.5 | 0.4433 | 0.6803 | 4.10E−08 |
| rs9382993 | 184 | −0.636 | 0.11 | 0.5 | 0.4266 | 0.6569 | 7.60E−09 |
| rs6916345 | 183 | −0.639 | 0.111 | 0.5 | 0.4252 | 0.6557 | 7.40E−09 |
| rs6920905 | 183 | −0.628 | 0.11 | 0.5 | 0.4298 | 0.6623 | 1.20E−08 |
| rs70993041 | 180 | −0.632 | 0.112 | 0.5 | 0.4269 | 0.6615 | 1.50E−08 |
| rs9349955 | 179 | −0.633 | 0.112 | 0.5 | 0.4263 | 0.6616 | 1.70E−08 |
| rs2327827 | 181 | −0.62 | 0.111 | 0.5 | 0.4328 | 0.6682 | 2.20E−08 |
| rs9358044 | 182 | −0.61 | 0.111 | 0.5 | 0.4371 | 0.6749 | 3.60E−08 |
| rs857414 | 184 | −0.568 | 0.111 | 0.6 | 0.4562 | 0.7043 | 3.00E−07 |

The above analyses also identified a genetic variant on chromosome 10, rs10128117, that was associated (P=1.4× $10^{-8}$) with gastrointestinal disorder in the colchicine treatment arm. When looking only at study participants with at least one copy of the risk genetic variant (genotype T/A at rs10128117 (13% of the population)), those individuals were 3.7 times more likely to have reported gastrointestinal disorders with colchicine than with placebo (HR=3.72, P=0.000008).

Additional SNPs on chromosome 10 associated with gastrointestinal disorders are provided in Table 24 below. These SNPs are either in the SEPHS1 gene, downstream or upstream of the SEPHS1 gene, or intergenic for the SEPHS1 and the PHYH (phytanoyl-CoA 2 hydroxylase) gene.

TABLE 24

SNPs associated with gastrointestinal disorders in males + females:

| snp | chr | pos | region | gene | Other allele | Effect allele | Effect allele frequency | n |
|---|---|---|---|---|---|---|---|---|
| rs535968 | 10 | 13,348,782 | intergenic | PHYH(dist = 6652), SEPHS1(dist = 10656) | T | C | 0.0561 | 759 |
| rs825610 | 10 | 13,350,801 | intergenic | PHYH(dist = 8671), SEPHS1(dist = 8637) | T | C | 0.0552 | 761 |
| rs9423893 | 10 | 13,351,852 | intergenic | PHYH(dist = 9722), SEPHS1(dist = 7586) | G | A | 0.0553 | 761 |
| rs10906346 | 10 | 13,355,442 | intergenic | PHYH(dist = 13312), SEPHS1(dist = 3996) | G | A | 0.0569 | 764 |
| rs11258319 | 10 | 13,355,542 | intergenic | PHYH(dist = 13412), SEPHS1(dist = 3896) | C | T | 0.0582 | 764 |
| rs2476986 | 10 | 13,355,988 | intergenic | PHYH(dist = 13858), SEPHS1(dist = 3450) | G | T | 0.0582 | 764 |
| rs615497 | 10 | 13,356,838 | intergenic | PHYH(dist = 14708), SEPHS1(dist = 2600) | A | G | 0.0587 | 765 |
| rs2783648 | 10 | 13,358,595 | downstream | SEPHS1 | T | A | 0.0616 | 760 |
| rs2253619 | 10 | 13,358,988 | downstream | SEPHS1 | C | T | 0.0581 | 764 |
| rs77006996 | 10 | 13,368,925 | intronic | SEPHS1 | C | T | 0.058 | 765 |
| rs7901525 | 10 | 13,370,926 | intronic | SEPHS1 | C | A | 0.0593 | 765 |
| rs61851591 | 10 | 13,371,855 | intronic | SEPHS1 | C | A | 0.058 | 765 |
| rs7917549 | 10 | 13,374,395 | intronic | SEPHS1 | G | A | 0.0593 | 765 |
| rs552621122 | 10 | 13,375,135 | intronic | SEPHS1 | ATT | A | 0.0593 | 765 |
| rs58260827 | 10 | 13,377,671 | intronic | SEPHS1 | C | CA | 0.0589 | 763 |
| rs74795203 | 10 | 13,377,992 | intronic | SEPHS1 | A | G | 0.0575 | 764 |
| rs7894075 | 10 | 13,378,068 | intronic | SEPHS1 | A | C | 0.0588 | 764 |
| rs61851592 | 10 | 13,378,666 | intronic | SEPHS1 | C | T | 0.0575 | 764 |
| rs61851593 | 10 | 13,378,798 | intronic | SEPHS1 | T | C | 0.0575 | 764 |
| rs7919509 | 10 | 13,383,011 | intronic | SEPHS1 | T | C | 0.0583 | 762 |
| rs7916194 | 10 | 13,383,060 | intronic | SEPHS1 | A | T | 0.0583 | 762 |
| rs10128117 | 10 | 13,384,400 | intronic | SEPHS1 | T | A | 0.057 | 762 |
| rs41291319 | 10 | 13,387,614 | intronic | SEPHS1 | G | A | 0.0555 | 758 |
| rs41291321 | 10 | 13,387,787 | intronic | SEPHS1 | G | C | 0.0569 | 755 |
| rs7902331 | 10 | 13,388,412 | intronic | SEPHS1 | C | T | 0.0569 | 755 |
| rs61851598 | 10 | 13,389,006 | intronic | SEPHS1 | G | A | 0.0564 | 754 |
| rs117874450 | 10 | 13,389,291 | intronic | SEPHS1 | C | T | 0.0564 | 754 |
| rs61851599 | 10 | 13,390,511 | upstream | SEPHS1 | C | T | 0.0564 | 755 |

| snp | n_events | coef | se | HR | hr_lower | hr_upper | P value |
|---|---|---|---|---|---|---|---|
| rs535968 | 185 | 0.8496 | 0.171 | 2.3 | 1.6739 | 3.2673 | 6.40E-07 |
| rs825610 | 185 | 0.8604 | 0.17 | 2.4 | 1.6933 | 3.3008 | 4.30E-07 |
| rs9423893 | 185 | 0.8599 | 0.17 | 2.4 | 1.6924 | 3.2989 | 4.40E-07 |
| rs10906346 | 186 | 0.902 | 0.167 | 2.5 | 1.7757 | 3.4207 | 6.90E-08 |
| rs11258319 | 186 | 0.8718 | 0.169 | 2.4 | 1.7186 | 3.3269 | 2.30E-07 |
| rs2476986 | 186 | 0.8717 | 0.169 | 2.4 | 1.7184 | 3.3267 | 2.30E-07 |
| rs615497 | 186 | 0.8683 | 0.169 | 2.4 | 1.7119 | 3.3168 | 2.70E-07 |
| rs2783648 | 187 | 0.8625 | 0.166 | 2.4 | 1.7108 | 3.2808 | 2.10E-07 |
| rs2253619 | 186 | 0.9205 | 0.166 | 2.5 | 1.8129 | 3.4769 | 3.00E-08 |
| rs77006996 | 187 | 0.9167 | 0.166 | 2.5 | 1.8072 | 3.461 | 3.20E-08 |
| rs7901525 | 187 | 0.8865 | 0.167 | 2.4 | 1.7493 | 3.3665 | 1.10E-07 |
| rs61851591 | 187 | 0.9168 | 0.166 | 2.5 | 1.8075 | 3.4617 | 3.20E-08 |
| rs7917549 | 187 | 0.8864 | 0.167 | 2.4 | 1.7489 | 3.3664 | 1.10E-07 |
| rs552621122 | 187 | 0.8864 | 0.167 | 2.4 | 1.7488 | 3.3664 | 1.10E-07 |
| rs58260827 | 187 | 0.8895 | 0.167 | 2.4 | 1.755 | 3.3755 | 9.80E-08 |
| rs74795203 | 187 | 0.9207 | 0.166 | 2.5 | 1.8151 | 3.4741 | 2.70E-08 |
| rs7894075 | 187 | 0.8903 | 0.167 | 2.4 | 1.7563 | 3.3783 | 9.50E-08 |
| rs61851592 | 187 | 0.9206 | 0.166 | 2.5 | 1.8148 | 3.4739 | 2.70E-08 |
| rs61851593 | 187 | 0.9206 | 0.166 | 2.5 | 1.8149 | 3.4738 | 2.70E-08 |
| rs7919509 | 187 | 0.9034 | 0.166 | 2.5 | 1.7824 | 3.4169 | 5.30E-08 |
| rs7916194 | 187 | 0.9034 | 0.166 | 2.5 | 1.7825 | 3.4169 | 5.30E-08 |
| rs10128117 | 187 | 0.9342 | 0.165 | 2.5 | 1.8429 | 3.5153 | 1.40E-08 |
| rs41291319 | 184 | 0.8843 | 0.17 | 2.4 | 1.7357 | 3.3774 | 1.90E-07 |
| rs41291321 | 184 | 0.8594 | 0.171 | 2.4 | 1.6904 | 3.2998 | 4.70E-07 |
| rs7902331 | 184 | 0.8596 | 0.171 | 2.4 | 1.6906 | 3.3007 | 4.70E-07 |
| rs61851598 | 184 | 0.8657 | 0.17 | 2.4 | 1.7017 | 3.3194 | 3.80E-07 |
| rs117874450 | 184 | 0.8656 | 0.171 | 2.4 | 1.7014 | 3.319 | 3.80E-07 |
| rs61851599 | 184 | 0.8665 | 0.171 | 2.4 | 1.7026 | 3.3226 | 3.80E-07 |

Functional Annotation Results

We defined credible candidate variants as those located within 500 kb of the most significant SNP in each region, and with P-values within two orders of magnitude of the most significant SNPs. A total of 10 variants were identified at the chromosome 9 locus, 21 variants at chromosome 6, and 29 variants at chromosome 10.

Chromosome 9

The SNP with highest probability of being causal within the 500-kbp region was rs10811106 alone (based on FINEMAP, CAVIAR) and with rs1854156, rs10118790, and rs28733572 (based on CAVIARBF). CAVIARBF calculated a posterior inclusion probability of 0.50 for the rs10811106 variant. The majority of the variants in the region are predicted to function as modifier of the gene expression of FAM154A (SAXO1), with the most credible functional variant as rs12377838 and rs7030400. Previously, variants in the SAXO1 gene have been associated with aortic root enlargement in the hypertensive population ($P=1.68 \times 10^{-6}$).[26] Regarding the sex-specificity of this signal, according to The Human Protein Atlas (www.proteinatlas.org/ENSG00000155875-SAXO1/tissue), SAXO1 protein levels were high in both the testis and the fallopian tubes. PhenoScanner identified rs10811106 as a modulator of the expression of genes PLIN2, HAUS6, RRAGA, and FBXO7, and associated with protein levels of palmitoleoyl-protein carboxylesterase (NOTUM) and ETS homologous factor, a transcriptional activator that may play a role in regulating epithelial cell differentiation and proliferation and a possible modulator of the nuclear response to mitogen-activated protein kinase (MAPK) signaling cascades. Using COLOC, we found possible overlap with SAXO1 gene expression in subcutaneous adipose tissue (PP H4=0.10), but there was stronger evidence for a colocalization with expression of the HAUS Augmin Like Complex Subunit 6 (HAUS6) gene in multiple tissues (PP H4=0.24 in the gastroesophageal junction) (FIG. 10A to FIG. 10E). The "T" allele of the lead variant at this locus (rs10811106) reduces HAUS6 expression and increased the risk of the primary CV endpoint in men in COLCOT. This gene encodes a subunit of the augmin complex involved in microtubule generation from existing microtubules as well as kinetochore-microtubule attachment and central spindle formation during anaphase. These effects may interact with those of colchicine which inhibits microtubule formation by binding to tubulins.

Chromosome 6

The SNP with highest probability of being causal within the 500-kbp region was rs6916345 based on FINEMAP. CAVIARBF analysis prioritized the set including rs6916345 with rs9382993 and rs6920905. CAVIARBF calculated a posterior inclusion probability of 0.17 for the rs6916345 variant. The majority of the variants in the candidate region are predicted as modifier of the pseudogene RNU6-793P expression. This gene is poorly annotated. One of the candidate variants, rs6903188, is located in a region predicted by ChromHMM experiments in fetal small intestine to be an enhancer of transcription by modulating the binding of HNF4a protein encoded by HNF4A, which controls the expression of several genes (Table 25). Dysregulation of HNF4a expression has been associated with many human diseases such as ulcerative colitis, colon cancer, maturity-onset diabetes of the young, liver cirrhosis, and hepatocellular carcinoma. Polymorphisms in the HNF4A gene have been associated with diabetes and childhood-onset Crohn's disease. PhenoScanner identified previous associations ($P<0.001$) with Crohn's disease, haematocrit, thyroid peroxidase (TPO) gene expression, and with decreased protein levels of the signaling lymphocytic activation molecule (SLAM) family member 5 and interferon gamma receptor 2. Colocalization analysis using COLOC confirmed the shared association between our GWAS and a large Crohn's disease GWAS meta-analysis (PP H4=0.57) (FIG. 10A to FIG. 10E). The protective G allele of the lead SNP at this locus, rs6916345, was associated with a reduction of Crohn's disease risk (OR=0.94 95% CI 0.91-0.97, $P=3.1 \times 10^{-5}$). This protective allele is also associated with a reduced reticulocyte count and hemoglobin concentration, one of the most common extra intestinal complication of Crohn's disease.

TABLE 25 predicted metabolizer phenotypes based on CYP3A4 allelic variants

|  | *1 | *2 | *5 | *6 | *7 | *8 | *12 | *20 | *22 | *1B | *1G | *15A | *15B | *16A | *16B | *18A | *18B |
|---|---|---|---|---|---|---|---|---|---|---|---|---|---|---|---|---|---|
| *1 | EM | IM | IM | IM | IM | IM | IM | IM | IM | UM | UM | IM | IM | IM | IM | IM | IM |
| *2 |  | PM | PM | PM | PM | PM | PM | PM | PM | EM | EM | PM | PM | PM | PM | PM | PM |
| *5 |  |  | PM | PM | PM | PM | PM | PM | PM | EM | EM | PM | PM | PM | PM | PM | PM |
| *6 |  |  |  | PM | PM | PM | PM | PM | PM | EM | EM | PM | PM | PM | PM | PM | PM |
| *7 |  |  |  |  | PM | PM | PM | PM | PM | EM | EM | PM | PM | PM | PM | PM | PM |
| *8 |  |  |  |  |  | PM | PM | PM | PM | EM | EM | PM | PM | PM | PM | PM | PM |
| *12 |  |  |  |  |  |  | PM | PM | PM | EM | EM | PM | PM | PM | PM | PM | PM |
| *20 |  |  |  |  |  |  |  | PM | PM | EM | EM | PM | PM | PM | PM | PM | PM |
| *22 |  |  |  |  |  |  |  |  | PM | EM | EM | PM | PM | PM | PM | PM | PM |
| *1B |  |  |  |  |  |  |  |  |  | UM | UM | EM | EM | EM | EM | EM | EM |
| *1G |  |  |  |  |  |  |  |  |  |  | UM | EM | EM | EM | EM | EM | EM |
| *15A |  |  |  |  |  |  |  |  |  |  |  | PM | PM | PM | PM | PM | PM |
| *15B |  |  |  |  |  |  |  |  |  |  |  |  | PM | PM | PM | PM | PM |
| *16A |  |  |  |  |  |  |  |  |  |  |  |  |  | PM | PM | PM | PM |
| *16B |  |  |  |  |  |  |  |  |  |  |  |  |  |  | PM | PM | PM |
| *18A |  |  |  |  |  |  |  |  |  |  |  |  |  |  |  | PM | PM |
| *18B |  |  |  |  |  |  |  |  |  |  |  |  |  |  |  |  | PM |

Chromosome 10

The SNP with the highest probability of being causal within the 500-kbp region was rs10128117 based on FINEMAP and CAVIAR analysis, followed by rs41291319 and rs825610 according to CAVIARBF. CAVIARBF calculated a posterior inclusion probability of 0.78 for the rs10128117 variant. Several candidate variants in the region are predicted as modifier of SEPHS1 gene expression through its promoter, including transcription factor binding sites. This gene encodes an enzyme that synthesizes selenophosphate from selenide and ATP. Two SNPs in SEPHS1 (rs17529609 and rs7901303) have previously been associated with modified selenium levels and an increase risk of developing Crohn's disease. Previous associations (P<0.001) were reported with use of potassium and phenegram medication (used to treat and prevent nausea and vomiting), phytanoyl-coa 2-hydroxylase (PHYH) gene expression, and decreased levels of the selenophosphate synthetase 1 (SEPHS1) gene expression.

Using COLOC, we found a strong colocalization (PP H4=0.98) of summary statistics for the pharmacogenomics and eQTL signals supported by consistent results for the lead SNP whose "G" allele reduces SEPHS1 expression (FIG. 10A to FIG. 10E). In a GWAS of immunoglobulin G (IgG)glycosylation, two variants in SEPHS1 that are also eQTLs for the gene were marginally associated with several glycosylation phenotypes ($p=1.7\times10^{-6}$ to $2.4\times10^{-7}$ for the association of rs1005089 with various IgG glycosylation parameters). These post-translational modifications can alter IgG effector responses by modulating affinity to the Fc receptors and are associated with inflammation, metabolic health and autoimmune responses. Whether the association of this locus with gastrointestinal disorder is driven by the modulation of an autoimmune response or an effect on systemic inflammation levels remains to be determined.

The genetic association results and functional annotation for chromosomes 6, 9, and 10 are summarized in Tables 26A and 26B.

TABLE 26A

Genetic association results

| rsID | Chr | Position | Imputed | NEA | EA | EAF | N | N events | Coefficient | SE | HR | HRL | HRU | P |
|---|---|---|---|---|---|---|---|---|---|---|---|---|---|---|
| rs6918045 | 6 | 14,645,927 | yes | C | T | 0.49 | 760 | 186 | −0.598 | 0.109 | 0.55 | 0.44 | 0.68 | 4.7E−08 |
| rs6459368 | 6 | 14,646,111 | yes | G | A | 0.49 | 759 | 186 | −0.602 | 0.110 | 0.55 | 0.44 | 0.68 | 4.0E−08 |
| rs6903188 | 6 | 14,646,772 | yes | A | G | 0.49 | 758 | 185 | −0.598 | 0.109 | 0.55 | 0.44 | 0.68 | 4.6E−08 |
| rs9476616 | 6 | 14,646,920 | yes | C | G | 0.49 | 754 | 182 | −0.607 | 0.110 | 0.55 | 0.44 | 0.68 | 3.8E−08 |
| rs12210439 | 6 | 14,647,026 | yes | G | A | 0.49 | 764 | 187 | −0.594 | 0.109 | 0.55 | 0.45 | 0.68 | 5.0E−08 |
| rs7747013 | 6 | 14,647,764 | no | A | G | 0.49 | 767 | 187 | −0.600 | 0.109 | 0.55 | 0.44 | 0.68 | 3.7E−08 |
| rs7751771 | 6 | 14,648,171 | yes | T | C | 0.49 | 766 | 187 | −0.598 | 0.109 | 0.55 | 0.44 | 0.68 | 3.8E−08 |
| rs7764937 | 6 | 14,648,227 | yes | G | C | 0.49 | 764 | 186 | −0.599 | 0.109 | 0.55 | 0.44 | 0.68 | 4.1E−08 |
| rs9382993 | 6 | 14,649,312 | yes | T | C | 0.50 | 752 | 184 | −0.636 | 0.110 | 0.53 | 0.43 | 0.66 | 7.6E−09 |
| rs6916345 | 6 | 14,649,353 | yes | A | G | 0.50 | 751 | 183 | −0.639 | 0.111 | 0.53 | 0.43 | 0.66 | 7.4E−09 |
| rs6920905 | 6 | 14,649,383 | yes | T | C | 0.50 | 751 | 183 | −0.628 | 0.110 | 0.53 | 0.43 | 0.66 | 1.2E−08 |
| rs70993041 | 6 | 14,650,151 | yes | T | TAA | 0.50 | 742 | 180 | −0.632 | 0.112 | 0.53 | 0.43 | 0.66 | 1.5E−08 |
| rs9349955 | 6 | 14,650,459 | yes | C | T | 0.50 | 740 | 179 | −0.633 | 0.112 | 0.53 | 0.43 | 0.66 | 1.7E−08 |
| rs2327827 | 6 | 14,650,754 | yes | A | G | 0.50 | 743 | 181 | −0.620 | 0.111 | 0.54 | 0.43 | 0.67 | 2.2E−08 |
| rs9358044 | 6 | 14,651,050 | yes | A | T | 0.50 | 748 | 182 | −0.610 | 0.111 | 0.54 | 0.44 | 0.67 | 3.6E−08 |
| rs10811106 | 9 | 19,037,533 | yes | C | T | 0.09 | 564 | 30 | 1.705 | 0.314 | 5.50 | 2.97 | 10.19 | 5.8E−08 |
| rs2253619 | 10 | 13,358,988 | yes | C | T | 0.06 | 764 | 186 | 0.921 | 0.166 | 2.51 | 1.81 | 3.48 | 3.0E−08 |
| rs77006996 | 10 | 13,368,925 | yes | C | T | 0.06 | 765 | 187 | 0.917 | 0.166 | 2.50 | 1.81 | 3.46 | 3.2E−08 |
| rs61851591 | 10 | 13,371,855 | yes | C | A | 0.06 | 765 | 187 | 0.917 | 0.166 | 2.50 | 1.81 | 3.46 | 3.2E−08 |
| rs74795203 | 10 | 13,377,992 | yes | A | G | 0.06 | 764 | 187 | 0.921 | 0.166 | 2.51 | 1.82 | 3.47 | 2.7E−08 |
| rs61851592 | 10 | 13,378,666 | yes | C | T | 0.06 | 764 | 187 | 0.921 | 0.166 | 2.51 | 1.81 | 3.47 | 2.7E−08 |
| rs61851593 | 10 | 13,378,798 | yes | T | C | 0.06 | 764 | 187 | 0.921 | 0.166 | 2.51 | 1.81 | 3.47 | 2.7E−08 |
| rs10128117 | 10 | 13,384,400 | yes | T | A | 0.06 | 762 | 187 | 0.934 | 0.165 | 2.55 | 1.84 | 3.52 | 1.4E−08 |

Chr: chromosome;
Position on GRCh37;
EA: effect allele;
EAF: effect allele frequency;
HR: hazard ratio;
HRL: lower bound of 95% CI of HR estimate;
HRU: upper bound of 95% CI of HR estimate;
NEA: non-effect allele;
SE: standard error

TABLE 26B

Functional annotation

| rsID | Chr | Position | Region | Nearest gene(s) | CADD consequences | Regulatory consequence | Transcript consequence | RegulomeDB score |
|---|---|---|---|---|---|---|---|---|
| rs6918045 | 6 | 14,645.927 | Intergenic | LINC01108, JARID2 | Upstream | Modifier RNU6-793P | | 5 |
| rs6459368 | 6 | 14,646.111 | Intergenic | LINC01108, JARID2 | Upstream | Modifier RNU6-793P | | 5 |
| rs6903188 | 6 | 14,646.772 | Intergenic | LINC01108, JARID2 | Noncoding change | Modifier RNU6-793P | | 3a, Less likely to affect binding HNF4A in Caco2 (differential, proliferation) |
| rs9476616 | 6 | 14,646.920 | Intergenic | LINC01108, JARID2 | Downstream | Modifier RNU6-793P | | 6 |
| rs12210439 | 6 | 14,647.026 | Intergenic | LINC01108, JARID2 | | Modifier RNU6-793P | | 6 |
| rs7747013 | 6 | 14,647.764 | Intergenic | LINC01108, JARID2 | | Modifier RNU6-793P | | 5 |
| rs7751771 | 6 | 14,648.171 | Intergenic | LINC01108, JARID2 | Downstream | Modifier RNU6-793P | | 6 |

TABLE 26B-continued

Functional annotation

| rsID | Chr | Position | Region | Nearest gene(s) | CADD consequences | Regulatory consequence | Transcript consequence | RegulomeDB score |
|---|---|---|---|---|---|---|---|---|
| rs7764937 | 6 | 14,648.227 | Intergenic | LINC01108, JARID2 | Downstream | Modifier RNU6-793P | | 6 |
| rs9382993 | 6 | 14,649.312 | Intergenic | LINC01108, JARID2 | Downstream | Modifier RNU6-793P | | 5 |
| rs6916345 | 6 | 14,649.353 | Intergenic | LINC01108, JARID2 | Downstream | Modifier RNU6-793P | | 6 |
| rs6920905 | 6 | 14,649.383 | Intergenic | LINC01108, JARID2 | Downstream | Modifier RNU6-793P | | 5 |
| rs70993041 | 6 | 14,650.151 | Intergenic | LINC01108, JARID2 | | Modifier RNU6-793P | | 7 |
| rs9349955 | 6 | 14,650.459 | Intergenic | LINC01108, JARID2 | Downstream | Modifier RNU6-793P | | 7 |
| rs2327827 | 6 | 14,650.754 | Intergenic | LINC01108, JARID2 | Downstream | Modifier RNU6-793P | | 7 |
| rs9358044 | 6 | 14,651.050 | Intergenic | LINC01108, JARID2 | Downstream | Modifier RNU6-793P | | 6 |
| rs10811106 | 9 | 19,037.533 | Intronic | SAXO1 | Modifier saxo1 | | | 6 |
| rs2253619 | 10 | 13,358.988 | Downstream | SEPHS1 | Regulatory, downstream | | SEPHS1 | 5 |
| rs77006996 | 10 | 13,368.925 | Intronic | SEPHS1 | Intronic | | SEPHS1 | 7 |
| rs61851591 | 10 | 13,371.855 | Intronic | SEPHS1 | | | SEPHS1 | 5 |
| rs74795203 | 10 | 13,377.992 | Intronic | SEPHS1 | Regulatory, intronic | Modifier promoter/open chromatin region | SEPHS1 | 3a, Less likely to affect binding of FOXM1. MTA3, BCL11A, EBF1, EP300, JUND, RUNX3, YY1, BATF, SPI1,TCF12, TCF3 |
| rs61851592 | 10 | 13,378.666 | Intronic | SEPHS1 | Intronic | | SEPHS1 | 6 |
| rs61851593 | 10 | 13,378.798 | Intronic | SEPHS1 | Intronic | | SEPHS1 | 6 |
| rs10128117 | 10 | 13,384.400 | Intronic | SEPHS1 | | | SEPHS1 | 6 |

Chr: chromosome: Position on GRCh37

Other Embodiments

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Some embodiments of the invention are within the following numbered paragraphs.

1. A method of treating a patient after having a myocardial infarction (MI), the method comprising initiating the administration of colchicine at a daily low dose to the patient within about 30 days of the MI.

2. The method according to paragraph 1, wherein the method comprises administering colchicine within 5, 10, 15, 20, or 25 days of the MI.

3. The method according to paragraph 2, wherein the method comprises administering colchicine within 10 days of the MI.

4. The method according to paragraph 2, wherein the method comprises administering colchicine within 15 days of the MI.

5. The method according to any one of paragraphs 1-4, wherein percutaneous coronary intervention was performed for treating the patient's MI.

6. The method according to any one of paragraphs 1-5, wherein the patient was prescribed a medication.

7. The method according to paragraph 6, wherein the medication is an antiplatelet agent.

8. The method according to paragraph 6, wherein the medication is aspirin.

9. The method according to paragraph 6, wherein the medication is a statin.

10 The method according to any one of paragraphs 1-9, wherein the patient is at a lower risk of an ischemic cardiovascular event.

11. The method according to any one of paragraphs 1-10, wherein the administration of colchicine is initiated upon assessment in (a) an emergency department (ED), (b) the hospital, or (c) a medical office setting.

12. The method according to any one of paragraphs 1-11, wherein the colchicine is in the form of a tablet.

13. The method according to any one of paragraphs 1-12, wherein the colchicine is administered at 0.3 to 0.7 mg.

14. The method according to any one of paragraphs 1-13, wherein the colchicine is administered at 0.4 to 0.6 mg, preferably 0.5 mg.

15. The method according to any one of paragraphs 1-14, wherein the colchicine is administered once, twice, or three times a day.

Other embodiments are within the claims.

What is claimed is:

1. A method of treating a patient after having a myocardial infarction comprising administering colchicine to the patient determined to have a genetic variant in its genome that is indicative of the patient benefiting from colchicine administration, wherein the genetic variant comprises polymorphic site rs10811106 in the patient's SAXO1 gene on chromosome 9.

2. A method of treating a patient after having a myocardial infarction comprising determining whether the patient has a genetic variant in its genome that is indicative of the patient benefiting from colchicine administration or does not have a genetic variant in the genome that is that is indicative of the patient suffering from a gastrointestinal disorder following colchicine administration, and administering colchicine to the patient determined to have a genetic variant in the genome that is indicative of the patient benefiting from colchicine administration or not to have a genetic variant in the genome that is that is indicative of the patient suffering a gastrointestinal disorder following colchicine administration, wherein the genetic variant in the genome that is indicative of the patient benefiting from colchicine administration comprises polymorphic site rs10811106 in the patient's SAXO1 gene on chromosome 9.

3. A method of identifying a patient who would benefit from the administration of colchicine, comprising determining the genotype of the patient at one or more polymorphic sites in the subject's SAXO1 gene, wherein at least one polymorphic site is rs10811106.

4. The method of claim 1, wherein the myocardial infarction was within thirty days.

5. The method of claim 4, wherein the myocardial infarction was within 5, 10, 15, 20, or 25 days.

6. The method of claim 1, wherein percutaneous coronary intervention was performed for treating the patient's myocardial infarction.

7. The method of claim 1, wherein the patient was prescribed a medication.

8. The method of claim 7, wherein the medication is an antiplatelet agent or a statin.

9. The method of claim 1, wherein the patient is at a lower risk of an ischemic cardiovascular event.

10. The method of claim 1, wherein the colchicine is in the form of a tablet or capsule.

11. The method of claim 1, wherein the colchicine is administered at 0.3 to 0.7 mg.

12. The method of claim 11, wherein the colchicine is administered at 0.5 mg.

13. The method of claim 1, wherein colchicine is administered one, twice, or three times a day.

14. The method of claim 13, wherein 0.25 mg of colchicine is administered twice a day.

15. The method of claim 1, wherein the genotype at polymorphic site rs10811106 is C/C.

16. The method of claim 1, wherein the genome comprises a further genetic variant at a polymorphic site selected from the group consisting of rs10118790, rs28733572, rs1854156, and rs10963895.

17. The method of claim 16, wherein the genotype at polymorphic site rs10118790, rs28733572, rs1854156, and/or rs10963895 is G.

18. The method of claim 1, wherein the patient has two copies of the genetic variant indicative of the patient benefiting from colchicine administration.

19. The method of claim 1, wherein the patient is male.

20. The method of claim 1, wherein the colchicine administration reduces the likelihood of a further cardiovascular event in the patient.

21. The method of claim 20, wherein the further cardiovascular event is a myocardial infarction.

* * * * *